(12) United States Patent
Bollapalli et al.

(10) Patent No.: US 10,469,542 B2
(45) Date of Patent: Nov. 5, 2019

(54) COMMUNICATIONS METHODS, APPARATUS AND SYSTEMS TO PROVIDE OPTIMAL MEDIA ROUTING

(71) Applicant: Ribbon Communications Operating Company, Inc., Westford, MA (US)

(72) Inventors: Nagesh Kumar Bollapalli, Bangalore (IN); Ashish Sharma, Bangalore (IN); Pendyala Satya Ravi Kiran, Bangalore (IN)

(73) Assignee: Ribbon Communications Operating Company, Inc., Westford, MA (US)

(*) Notice: Subject to any disclaimer, the term of this patent is extended or adjusted under 35 U.S.C. 154(b) by 288 days.

(21) Appl. No.: 15/445,946

(22) Filed: Feb. 28, 2017

(65) Prior Publication Data

US 2017/0251028 A1    Aug. 31, 2017

Related U.S. Application Data

(60) Provisional application No. 62/301,170, filed on Feb. 29, 2016.

(51) Int. Cl.
  *G06F 15/16* (2006.01)
  *H04L 29/06* (2006.01)
  *H04L 29/08* (2006.01)

(52) U.S. Cl.
  CPC ...... *H04L 65/1069* (2013.01); *H04L 65/1006* (2013.01); *H04L 65/1016* (2013.01); *H04L 65/1036* (2013.01); *H04L 67/10* (2013.01); *H04L 67/141* (2013.01); *H04L 67/28* (2013.01); *H04L 69/22* (2013.01)

(58) Field of Classification Search
  CPC ............ H04L 65/1069; H04L 65/1036; H04L 65/1016; H04L 65/1006; H04L 67/141; H04L 67/10; H04L 67/28; H04L 69/22
  See application file for complete search history.

(56) References Cited

U.S. PATENT DOCUMENTS

2005/0237931 A1* 10/2005 Punj .................. H04L 29/06027
                                                              370/229
2012/0185600 A1*  7/2012 Belling .................. H04L 45/00
                                                              709/227

(Continued)

*Primary Examiner* — Padma Mundur
(74) *Attorney, Agent, or Firm* — Straub & Straub; Stephen T. Straub; Michael P. Straub

(57) ABSTRACT

The present invention is directed to methods, apparatus and systems for optimizing media paths in communications networks. An exemplary embodiment includes the steps of a first SBC (SBC1) receiving a session request including a SDP offer for a session between first and second devices including media stream(s), said request being sent by a second SBC (SBC2) and traversing a portion of a signaling path including intermediary device(s), determining that media stream(s) should bypass one or more of the intermediary device(s), generating and transmitting to SBC2 from SBC1 a SDP answer including at least one of: (i) all SDP media descriptor transport addresses being set to zero; (ii) all SDP media stream connection values being set to 0.0.0.0 and at least one media transport address being non-zero; or (iii) header information or SDP information indicating that at least one intermediary device should be bypassed for the one or more media streams.

20 Claims, 13 Drawing Sheets

(56) References Cited

U.S. PATENT DOCUMENTS

2014/0323125 A1* 10/2014 Hegarty .................. H04W 8/04
 455/433
2016/0156544 A1* 6/2016 Holm ...................... H04L 45/02
 370/389

* cited by examiner

X-sonus-OMR-Info: v=0;m=0;z=1;b=9;p=216.110.2.31;a=default;l=225; s=ez9&xzRMaRK5a807.831.7.787&zigkn k:81aT270/1999& zungk:81a mmvcyzml& zigkn k:872agyovkslmv-vevmg/1999& zungk:872a9-84& zhvmwivxe& zn ckgrnv:849&;

900

EXAMPLE OF FORMAT OF PROPRIETARY HEADER USED TO COMMUNICATE INGRESS SDP OR HINT

FIGURE 9

COMMUNICATIONS METHODS, APPARATUS AND SYSTEMS TO PROVIDE OPTIMAL MEDIA ROUTING

RELATED APPLICATION

The present application claims the benefit of U.S. Provisional Patent Application Ser. No. 62/301,170 filed on Feb. 29, 2016 which is hereby expressly incorporated by reference in its entirety.

FIELD

The present invention relates to communications methods, systems and apparatus for achieving optimized media paths and more particularly for achieving optimized media paths in an asynchronous network including a mix of nodes/devices some of which implement and others of which do not implement Optimal Media Routing (OMR) procedures as per 3GPP and also in media, e.g., video, pass-through scenarios involving external transcoders/media servers.

BACKGROUND

In VoLTE/3GPP (Voice Over LTE/3rd Generation Partnership Project) deployments, when a subscriber roams into a different operator's network (visited network), the signaling is still anchored in the home-network, as the services are provided by the home-network. Given that signaling and media follow the same path, the media also traverses the home network. This doesn't mimic the standard Circuit Switch (CS) call model.

3GPP has defined RAVEL (Roaming Architecture for Voice-over-LTE using Local Break-out) and Optimal Media Routing (OMR) procedures in which the signaling and media take different paths. At a high-level, the OMR procedures involve the following.

- Each of the media-processing entities passing Session Description Protocol (SDP)/media attributes that they have received on the ingress side (along with the "realm" information) and passing them to the egress call-leg. This information is passed in newly defined OMR attributes along with the main SDP.
- The succeeding nodes make use of main SDP and OMR attributes and decide to include themselves in the media path or not. The "realm" information that is passed in OMR attributes along with other policy information is made use of in arriving at this decision (of media anchoring or not).

When a roaming UE originates a call, the visited network routes the call towards the home-network. The P-CSCF in the visited-network indicates that this call is eligible for loop-back (using TRF indication in Feature-Caps header) (See Internet Engineering Task Force (IETF) Request for Proposal (RFP) 6809 entitled Mechanism To Indicate Support of Features and Capabilities in the Session Initiation Protocol (SIP)). This call traverses a set of IBCFs (Inter-Connect Border Control Functions) which apply OMR procedures at the time of SDP offer itself, based on the indication that the call is eligible for loop-back. (Typically at this point of time, the media is anchored at most/all of the SBCs as the "realm" for various operators would be different).

When the home-network decides to loopback the call towards the visited network, the S-CSCF (Serving-Call Session Control Function) in the home-network would insert an indication that the call is a looped-back call (in Feature-Caps header). When the call is looped back towards the visited network, the call traverses through a set of IBCFs. Each of the IBCFs apply OMR procedures and take themselves out of the path. IBCF applies OMR procedures based on the indication that the call is a looped-back call. The reason why IBCFs would be able to bypass previous node(s) and/or take themselves out of the path is, as the call traverses/loops-back through the same set of "realms" (as it has originally started from). As the IBCFs take bypass previous nodes, the SDP answer is generated with appropriate indication (c=0.0.0.0 is defined with specific semantics) so that intermediaries know that they have been bypassed.

Furthermore, with the advent and proliferation of different technologies, each of which is optimized for different access-types and each of which employ different codecs, it is not an uncommon phenomenon that the call gets transcoded as it traverses through networks employing different kinds of technology. For e.g., in LTE network AMR (Adaptive Multi-Rate codec) is used for voice; in CDMA networks EVRC (Enhanced Variable Rate Codec) is used for voice; in a WebRTC network OPUS a lossy audio coding format developed by the IETF is used for voice; in a traditional PSTN (Public Switched Telephone Network) network G711 is used for voice. On a similar note, different codecs are employed for video too. For e.g., in LTE network H.264 is recommended for video; in a WebRTC network VP8 video encoding format is used for the same.

This creates the need for SBC (Session Border Controller) vendors to provide transcoding not only for audio streams but also video streams. The SBC nodes provide video transcoding by invoking MRF nodes, which have specialized functions to provide audio and video transcoding. The SBCs typically invoke MRF (Media Resource Function) nodes using SIP-based interface i.e. the call is routed via an MRF and MRF egresses the call by acting as a SIP B2BUA (Back to Back User Agent).

As a SBC invokes MRF in anticipation of transcoding (pro-active transcoding approach), it may turn out after the offer-answer model, the call doesn't need to be transcoded. Typically MRFs don't support OMR procedures and hence the MRF continues to be in the media path (even when transcoding is not invoked).

One of the main issue with current OMR procedures is that all the intermediaries must support OMR procedures. If intermediaries don't support OMR procedures, the OMR attributes are NOT carried forward and succeeding nodes can't invoke OMR procedures. Even if OMR attributes are passed as un-known attributes, certain validations as defined by the OMR procedures (in 3GPP TS 29.079) fail and OMR procedures are NOT invoked. This is correct since a Non-OMR node can't be instructed to bypass itself (and thus release local media resources) using OMR-specific semantics in an SDP answer. Furthermore, the OMR procedures are difficult to implement. As a result, when even one intermediary node does not support OMR procedures optimal media routing cannot be obtain and intermediary nodes, media resources, and devices resources are wasted. This is a technological communications network centric problem, e.g., Internet problem, in which the lack of optimal media routing results in subpar network performance, unnecessary network congestion, routing of media through intermediary nodes or MRF resources unnecessarily resulting in wasted resources, e.g., MRF resources, an inability to support media streams due to resources being allocated which are not being used, additional expenses in routing and anchoring media at one or more devices in one or more different networks needlessly, and/or the introduction of unnecessary delays, noise and distortion into the media streams which are not optimally routed.

From the above discussion, it should be appreciated that there is a need for improved communications methods, systems and apparatus for achieving optimized media paths in an asynchronous network. Furthermore, there is a need for improved communications methods, systems and apparatus for determining and optimizing media paths which include Non-OMR (Non-Optimal Media Routing) nodes that is nodes which do not implement 3GPP OMR procedures. There is also a need for communications methods, systems and apparatus which determine media routing paths in which intermediary nodes in a media path can be bypassed so as to free up intermediary nodes and MRF resources and in doing so overcome one or more of the aforementioned technological problems resulting from non-optimal routing of media. There is also a need to determine and achieve improved media path routing in media, e.g., video, pass-through scenarios involving external transcoders/media server so that these devices resources can be freed up or made available for other media streams. Moreover, there is a need for improved media path routing wherein a MRF device may initially exclude itself from a media path but be subsequently added to the media path if necessary such as for example a subsequent need for trancoding of the media of the session. Furthermore, there is a need for technological improvements to session border controllers so that they can be operated to achieve optimal media routing for communications session with media streams when one or more nodes/devices on the media routing path for the communications session do not implement 3GPP OMR procedures.

SUMMARY

The present invention includes communications methods, apparatus and systems directed to addressing one or more of the needs identified above. Various new methods, apparatus and systems are described to determine and implement optimizations to routing of media paths.

The invention provides mechanisms through which both OMR and Non-OMR intermediaries in a media path can by bypassed while receiving instructions and/or indications to release local media resources so that optimal media routing can be achieved without the need to implement OMR procedures in all intermediate nodes.

The "media release" logic or mechanisms that is used in various embodiments can also be used to instruct MRF(s) to not include themselves in the media path—but to include themselves in the signaling path, so that the MRF(s) can still be in the path if a subsequent offer-answer results in transcoding.

An exemplary communications method in accordance with one embodiment of the invention includes the steps of receiving, at a first Session Border Controller, a session initiation request for a communications session between a first device and a second device, said session initiation request being sent by a second session border controller on behalf of the first device and traversing a portion of a signaling path extending between the first device and the first SBC before being received at said first SBC, said portion of the signaling including one or more intermediary devices, said communications session including one or more media streams, determining, by the first session border controller, whether at least one of said one or more media streams should bypass one or more of the intermediary devices; and in response to determining that at least one of said one or more media streams should bypass one or more of the intermediary devices, operating the first session border controller to generate a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address); ii) all SDP media stream connection values (e.g., c=value) being set to 0.0.0.0 and at least one media port address being non-zero; or iii) header information (e.g., SIP proprietary header) or SDP information (proprietary SDP attribute) indicating that at least one intermediary device (e.g., media resource function device) should be bypassed for the one or more media streams; and transmit the first SDP answer to the second session border controller included on said signaling path. In some embodiments, the received session initiation request includes at least some SDP offer information received by the second SBC from the first device, said at least some SDP offer information including a media transport address (e.g., m=audio address) provided by the first device for a media stream of said communications session. In some embodiments, said at least some SDP offer information is included in a header field of the session initiation request which is automatically passed through intermediate nodes. In some embodiments, the method further comprises the steps of operating the first session border controller to determine if the session initiation request corresponds to a loop back communications session.

In some embodiments the step of operating the first session border controller to determine if the session initiation request corresponds to a loop back session includes: checking call leg information in the session initiation request to determine if the call leg information indicates that the first and second session border controllers are in the same network realm.

In some embodiments, the step of operating the first session border controller to determine if the session initiation request corresponds to a loop back session includes: checking a header field (e.g., a Feature-Caps header field) for a value (e.g., +g.3gpp.loopback) expressly indicating a loopback communication session.

In some embodiments, the one or more intermediary nodes do not support 3GPP Optimal Media Routing procedures.

In some embodiments, the method further comprises the steps of extracting the media transport address (e.g., m=audio address) provided by the first device for a media stream of said communications session from said at least some SDP offer information included in the received session initiation request in a proprietary attribute or in SIP header as described above; and sending to the second device a second session initiation request generated, by the first session border controller, on behalf of the first device, said second session initiation request including a second SDP offer that includes the extracted media transport address (m=) provided by the first device.

In some embodiments, the method further includes the step of receiving from the second device a second SDP answer including information provided by the second device in response to the second SDP offer, said information provided by the second device including a media transport address of the second device for use by a media stream of said communications session.

In some embodiments, the first SDP answer includes all SDP media descriptor transport addresses being set to zero in standardized media descriptor fields of the first SDP answer; and the step of operating the first session border controller to generate an SDP answer in response to the first SDP offer includes: extracting at least some of the information from the second answer, said extracted information including the media transport address of the second device for use by the media stream of said first communications session; and placing the media transport address of the second device in i) a proprietary header field which are different from standardized said media descriptor fields or ii) a propriety SDP attribute field of the first SDP answer which is from standardized said media descriptor fields. In some embodiments, the method further includes the steps of operating the second session border controller to receive the second SDP answer; operating the second session border controller to extract from the propriety header or propriety SDP attribute field of the second SDP answer the media transport address of the second device; and operating the second session border controller to send a third SDP answer including the media transport address of the second device to the first device. In some embodiments, the method further includes the step of operating the first device to communicate media to the second device using the media transport address of the second device as part of the communications session, said media bypassing one or more of said intermediary devices.

In some embodiments, the first and second session border controllers act as, serve as or implement the functions of InterConnect Border Control Function devices.

Various embodiments include devices, systems, and/or apparatus which perform the steps of the various method embodiments.

While various embodiments have been discussed in the summary above, it should be appreciated that not necessarily all embodiments include the same features and some of the features described above are not necessary but can be desirable in some embodiments. Numerous additional features, embodiments, and benefits of various embodiments are discussed in the detailed description which follows.

BRIEF DESCRIPTION OF THE DRAWINGS

FIG. 9 illustrates an exemplary proprietary SIP header including SDP information in accordance with an exemplary embodiment of the present invention.

DETAILED DESCRIPTION

A brief background explaining Optimal Media Routing based on 3GPP TS 23.228 procedures will now be described in connection with an exemplary OMR call-flow.

Figure 1:
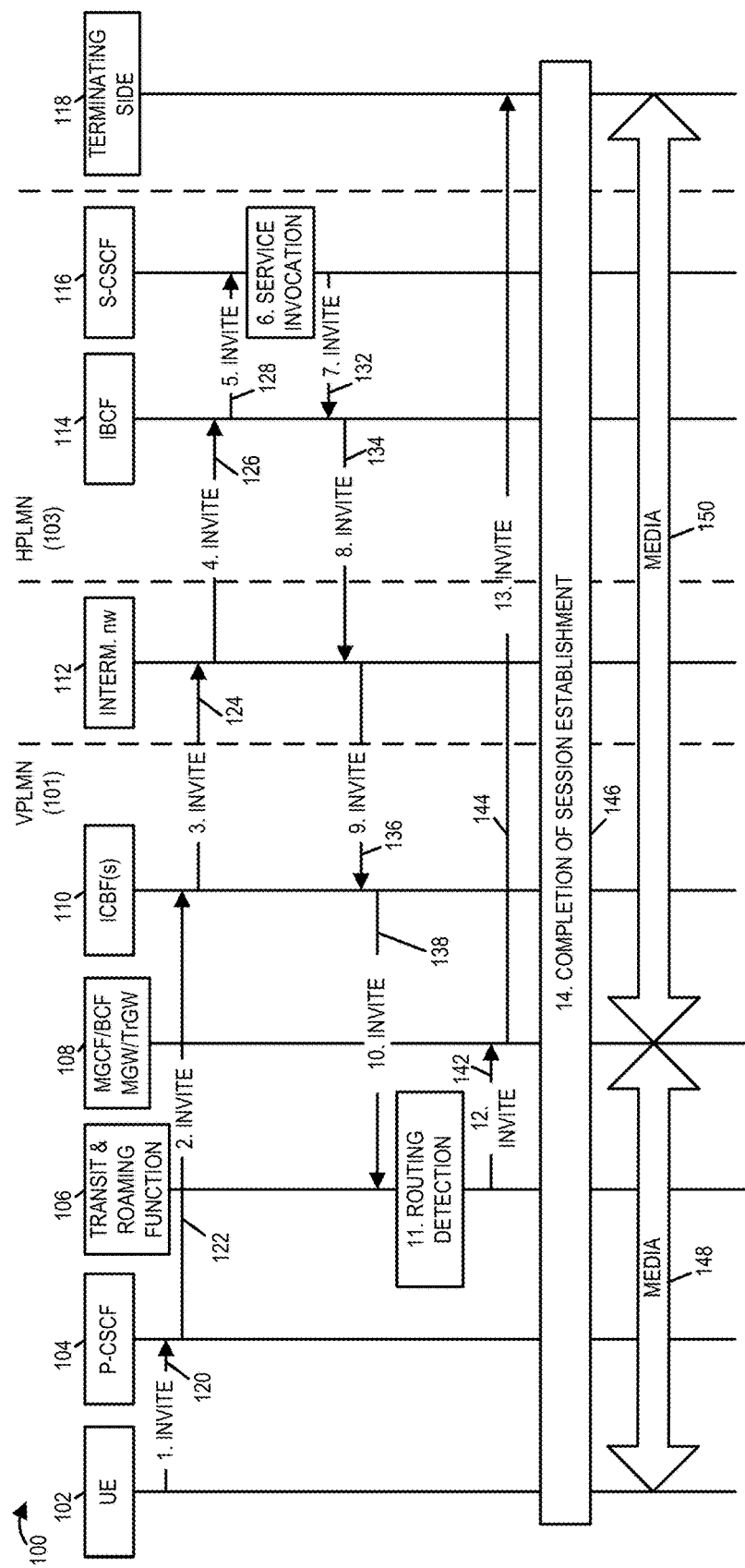
FIG. 1 is a drawing illustrating an exemplary OMR call-flow in an exemplary communications system.

FIG. 1 includes a drawing 100 illustrating an exemplary OMR call-flow in an exemplary communications system. The exemplary communications system includes Visited Public Land Mobile Network (VPLMN) 101, an Intermediate Network 112, a Home Public Land Mobile Network (HPLMN) 103, and a terminating side device 118. VPLMN 101 includes a user equipment (UE) device 102, a Proxy-Call Session Control Function (P-CSCF) 104, a transit and roaming function (TRF) 106, a Media Gateway Control Function/Interconnect Border Control Function/Media Gateway/Transition Gateway (MGCF/IBCF/MGW/TrGW) 108, and InterConnect Border Control Functions (ICBF(s)) 110. HPLMN 103 includes IBCF 114 and Serving-Call Session Control Function (S-CSCF) 116.

Exemplary OMR call-flow based on 3GPP TS 23.228 is described below.

The information flows for originating session with Visited Public Land Mobile Network (VPLMN) 101 routing for this scenario are illustrated in FIG. 1.

FIG. 1 illustrates an exemplary scenario with P-CSCF 104 located in visited network 101 and with VPLMN routing. Steps 1 through 14 shown in FIG. 1 will now be explained.

In step 1, the roaming UE 102 (user equipment, e.g., mobile device) sends an INVITE request 120 to the P-CSCF 104.

In step 2, the P-CSCF 104 forwards the INVITE request to the visited IBCF 110, as INVITE request 122. Based on operator policy, the P-CSCF 104 adds a reference to the preferred Transit and Roaming Function 106.

In step 3, this first IBCF 110 in the VPLMN 101 allocates a Transition Gateway (TrGW) for the media and follows standard OMR procedures when forwarding the INVITE request, as INVITE request 124, to allow this TrGW to be bypassed if the INVITE request later returns to the VPLMN 101 and no other intermediate nodes anchor the media before the request returns.

In steps 4 and 5, the intermediate network 112 and the first IBCF 114 in the Home Public Land Mobile Network (HPLMN) 103 forward the INVITE request to the S-CSCF 116, as INVITE request 126 and INVITE request 128, respectively. Nodes in the intermediate network 112 and the first IBCF 114 in the HPLMN 103 support OMR and allow their TrGWs to be bypassed.

In step 6, the S-CSCF (Serving-Call Session Control Function) 116 performs service invocation.

In step 7, the S-CSCF 116 performs a routing decision operation, and based on local policy and on the facts that the UE 102 is roaming, a roaming agreement for VPLNM 101 call routing is in place, and home routing is not required, the S-CSCF 116 decides to route back to the VPLMN 101 for call routing. A loopback indicator is included in the INVITE request 132 to inform the VPLMN 101 that this request is being routed back to the VPLMN 101 for call routing. The S-CSCF 116 can also forward UE 102 location information to the VPLMN 101. If a reference to the preferred Transit and Roaming Function 106 is available in the request, the S-CSCF 116 uses this information to route the session back to the VPLMN 101. If a reference to the preferred Transit and Roaming Function 106 is not available, the S-CSCF 116 uses a default derived address to the Transit and Roaming Function 106 to route the session back to the VPLMN 101.

If local policy requires access to BGCF (Border Gateway Control Function) routing data to make the loopback decision for a particular SIP request, then the loopback decision can be performed in a BGCF located in the HPLMN 103.

In steps 8 and 9, the IBCF 114 in the HPLMN 103 and the intermediate network 112 forward the SIP request, as INVITE request 134 and INVITE request 136, respectively, towards the indicated Transit and Roaming Function 106 in the VPLMN 101. Functions in the intermediate network 112 support OMR and allow their TrGWs (if any) to be bypassed.

In step 10, the IBCF 110 in the VPLMN 101 receives the SIP request 136, notes that the SDP includes an alternative media address within the VPLMN 101 that allows bypass of allocated TrGWs, applies OMR to remove any TrGWs allocated between the VPLMN 101 and HPLMN 103, and forwards the request, as INVITE request 138, to the indicated Transit and Roaming Function 106.

In step 11, based on the loopback indicator, the Transit and Roaming Function 106 detects that this is a loopback request. The Transit and Roaming Function 106 routes the request, as INVITE request 142, toward the destination network based on available SIP URI, ENUM lookup, or BGCF routing. The Transit and Roaming Function 106 can use information such as originating UE 102 location to select a nearby egress point for media anchoring.

In step 12, if the called party is determined to be available in IMS (IP Multimedia Subsystem) of a different operator, the call is routed towards the remote end through an IBCF. If the called party is determined to be available in CS (circuit switched), the call is broken out to CS through an MGCF (Media Gateway Control Function) 108. If the called party is determined to be available in VPLMN 101, the call is routed to the I-CSCF (Interrogating Call Session Control Function). The called party information is included in the Request URI when forwarding the request to the next hop.

When forwarding to an IBCF, the Transit and Roaming Function 106 ensures by means of signalling that media is anchored in the VPLMN 101.

It should be noted that in the case that the called user is an IMS user of the VPLMN 101 then the call will be routed directly to the terminating side, (i.e., I-CSCF of the VPLMN 101) without traversing an MGCF/IBCF (Media Gateway Control Function/Interconnect Border Control Function) 108.

In step 13, the MGCF/IBCF 108 performs normal call routing procedures, including sending INVITE request 144 to terminating side 118, to route towards the remote network/end.

It should be noted that the call will be anchored in the VPLMN 101 (outgoing IBCF 110), and OMR is not provided towards the terminating side 118.

In step 14, the session establishment is completed, as indicated by block 146.

It should be noted that during subsequent session establishment signalling, OMR information passed back through the IBCFs (110, 114) and intermediate networks 112 between the VPLMN 101 and HPLMN 103 cause them to release any allocated TrGWs.

The key points from the above discussion of the OMR call-flow based on 3GPP TS 23.228 are as follows.

At the time of an SDP offer, a given IBCF, e.g., IBCF 110, may de-allocate its TrGWs as well as de-allocate any previously allocated IBCF's TrGW. This would enable an optimal media path.

While sending an SDP answer, the previous nodes are informed with a c=0.0.0.0 so as to enable them to release their local resources that they have allocated at the time of the SDP offer.

S-CSCF 116 decides whether to loop-back the call or not. If S-CSCF 116 decides to loop back the call, it puts a loop-back indication (in Feature-Caps header). More importantly, if the call is NOT to be looped back, this indication is NOT inserted.

IBCFs, e.g., IBCF 110 apply OMR procedures when the INVITE has either "loopback" indication or information on call-leg identification ("Visited-Network to Home-Network" call-leg or "Home-Network-to-Visited-Network" call-leg). The supporting excerpt from the standards is as follows:

1) a received initial INVITE request contains a Feature-Caps header field with a "+g.3gpp.trf header field parameter, a "+g.3gpp.loopback" header field parameter or any other implementation dependent indication; or an implementation dependent indication can for example be in a URI parameter, a character string in the user part of the URI or be a port number in the URI.
2) if indicating traffic leg as specified in draft-holmberg-dispatch-iotl [225] is supported and used:
   a) the "iotl" SIP URI parameter with the value "visitedA-homeA" in the bottommost Route header field; or
   b) the "iotl" SIP URI parameter with the value "homeA-visitedA" in the bottommost Route header field.
3) By way of summary, there is sufficient information inserted by S-CSCF 116 to indicate this is a "looped-back call" and also identify the call-leg as that of between S-CSCF 116 & TRF 106.

The S-CSCF 116 policy is operator specific. This can take into consideration that a) the call may be subjected to Lawful Interception (LI) b) the call needs to be connected to an announcement server in home-network (and hence the media has to be routed to home-network) c) based on digit analysis that the called party belongs to a PSTN network that is closer to where the calling party is roaming etc. The supporting excerpt from a GSMA document is as follows: "Use cases may exist where call will need to be HPMN [Home Public Mobile Network] routed at the IMS NNI [Network to Network Interface] e.g. activate lawful interception at HPMN, Insertion of tones/announcements."

This means that it is up to S-CSCF 116 to decide whether to loop back the call or not (i.e. whether it is ok to allow optimal media routing or to force media anchoring towards home-network). The actual policy may include the use-cases mentioned above as well as other use cases.

Policy such as for example, lawful interception (LI) etc., are not decided by the IBCF alone—as has been discussed in the 3GPP standards.

If S-CSCF 116 decides to not loop-back the call, none of the above mentioned indications are inserted in the INVITE messages (neither loop-back indication nor information on call-leg identification). IBCF, e.g., IBCF 110, doesn't invoke OMR procedures.

When OMR procedures are invoked AND a given IBCF, e.g., IBCF 110, de-allocates a previous node, an SDP answer is sent with c=0.0.0.0 with OMR specific attributes so that those IBCFs will de-allocate local resources, while the media is optimally routed.

Figure 2:
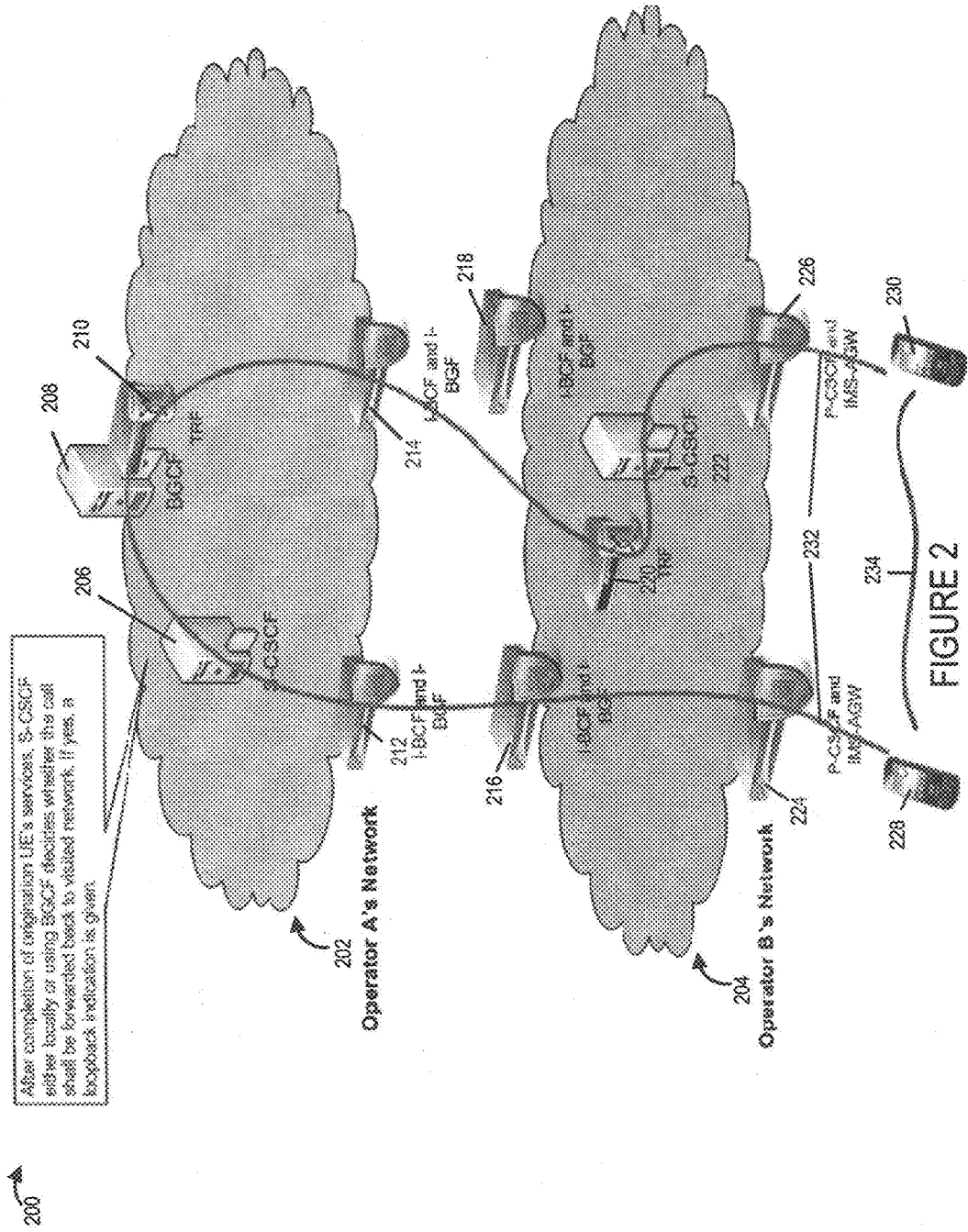
FIG. 2 illustrates a diagram of a call-flow wherein a call is established between a roaming user A and another user, user B, residing in the same network as the network where user A is roaming.

Drawing 200 of FIG. 2 illustrates a high-level block diagram of a call-flow for a case where the call is established between a roaming user A and another user, user B, residing in the same network as that where user A is roaming. In FIG. 2, operator A's network 202 includes S-CSCF 206, BGCF 208, TRF 210, I-BCF and I-BGF/TrGW 212 and I-BCF and I-BGF/TrGW 214. In FIG. 2, operator B's network 204 includes I-BCF and I-BGF/TrGW 216, I-BCF and I-BGF/TrGW 218, TRF 220, S-CSCF 228, Proxy-Call Session Control Function and IMS-Access Gateway (P-CSCF and IMS-AGW) 224, and P-CSCF and IMS-AGW 226. FIG. 2 further includes roaming user A's mobile communications device 228 and user B's mobile communications device 230. In the example of FIG. 2 both communications devices (228, 230) are currently residing in the same network coverage area, e.g., the network B coverage area.

After completion of origination UE's services, S-CSCF 206 either locally or using BGCF 208 decides whether the call shall be forwarded back to the visited network 204. If it is decided that the call shall be forwarded back to the visited network, a loopback indication is given. Based on the loopback indication, all the media processing nodes between HPLMN 202 and VPLMN 204 de-allocate the media resources and thus provide optimal media routing between UE's. Line 232 illustrates a signaling path for session establishment which traverses both network A 202 and network B 204. Line 234 is used to illustrate that the signaling path for media signaling between UE 228 and UE 230 remains within network B 204.

Figure 3:
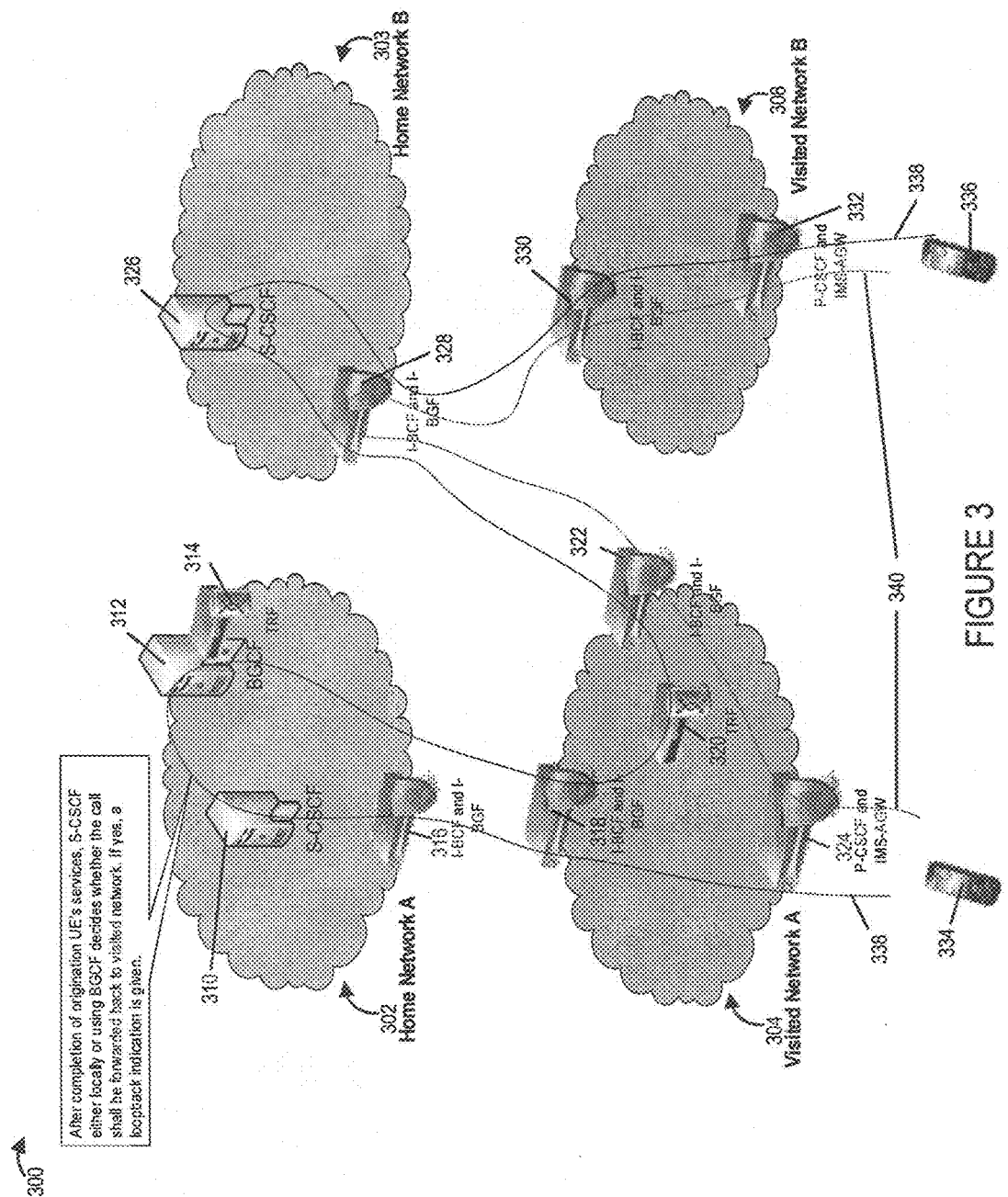
FIG. 3 illustrates a diagram of a call-flow wherein a call is established between a roaming user A and another user, user B, residing in a different network than that of where user A is roaming.

Drawing 300 of FIG. 3 illustrates a high-level block diagram of call-flow for a case where the call is established between a roaming user A and another user, user B, residing in a different network than that of where user A is roaming. In FIG. 3, operator A's home network 302 includes S-CSCF 310, BGCF 312, TRF 314, and I-BCF and I-BGF/TrGW 316.

In FIG. 3, user B's home network 303 includes I-BCF and I-BGF/TrGW 328 and S-CSCF 326. FIG. 3 further includes network 304, which is the visited network for roaming user A, network 304 including I-BCF and I-BGF/TrGW 318, TRF 320, I-BCF and I-BGF/TrGW 322, and P-CSCF and IMS-AGW 324. FIG. 3 further includes network 308, which is the visited network for roaming user B, network 308 including I-BCF and I-BGF/TrGW 330, and P-CSCF and IMS-AGW 332. FIG. 3 further includes roaming user A's mobile communications device 334 and roaming user B's mobile communications device 336. In the example of FIG. 3 user A's communications device 334 is currently residing in network 304's coverage area; and user B's communications device 308 is currently residing in network 308's coverage area.

After completion of origination UE's services, S-CSCF 310 either locally or using BGCF 312 decides whether the call shall be forwarded back to the visited network 304. If it is decided that the call shall be forwarded back to the visited network, a loopback indication is given which is included in the signaling from S-CSCF 310. Based on the loopback indication, all the media processing nodes between HPLMN 302 and VPLMN 304 de-allocate the media resources and thus provide optimal media routing between UE's. Line 338 illustrates a signaling path for session establishment which includes visited network A 304, home network A 302, home network B 303, and visited network B 308. Line 340 is used to illustrate that the media path between UE 334 and UE 336 includes visited network A 304, home network B 303 and visited network B 308. Note that the media path does not traverse home network A 302.

The approach shown and described with respect to FIGS. 1-3 requires that OMR 3GPP TS 23.228 procedures are supported by all intermediaries in the path. There is a need for an alternative mechanism through which optimal media routing can be achieved that does not require all intermediaries in the path support OMR 3GPP TS 23.228 procedures.

The currently known direct-media functionality cannot be used for the following reasons.

Current direct-media functionality assumes that when x-DMI attribute is received, the call can be applied with direct media mechanism. In case of optimal media routing, this shall be done only when the call is looped back and for roaming subscribers.

If any of the intermediaries are doing Lawful Interception (LI), the current direct-media mechanism would actually bypass the intermediary which should not be done.

The current direct-media mechanism does not indicate to other intermediaries that they can take themselves out of path. The direct-media mechanism sends normal SDP offer and answer messages and this results in intermediate nodes still "expecting" media—whereas the media is actually bypassed.

In such cases, the intermediaries may and sometimes do turn on Real-Time Transport Protocol (RTP) inactivity detection and clear the call.

To overcome these problems and one or more of the problems discussed above the following method may be, and in some embodiments is, implemented:

When an INVITE is received, Session Border Controller (SBC) (acting act as IBCF or Internetwork Packet Exchange (IPX) proxy) would insert ingress Session Description Protocol (SDP) information in a proprietary attribute (this could be at SDP level or may be, an unknown header or a hint in a known-header) if the call is an originating call from a roaming UE. This could be derived based on the following mechanism:

(A) If Service-Route is inserted, an "orig" indication can be inserted in the same. This, in turn, would be received in a Route header and the indication can be used to derive it is an originating call.

(B) P-CSCF (Proxy-Call Session Control Function) inserts Feature-Caps header with a TRF address for an originating call from a roaming UE. (Feature-Caps:*;+g.3gpp.trf="<sip:trfl.visitedV.netiotl=homeA-visitedA").

(C) The identification of the call-leg as "homeA-visitedA" in the "iotl" parameter and this could be present in bottom-most Route header or in Feature-Caps header.

If this is an originating call, the SDP information could be put in a proprietary attribute or locally stored (in a storage device, e.g., memory, database, etc.) and a hash-key hint is generated and sent as a part of the TRF address as a parameter or as an unknown header. The hint could be provided in such a way another SBC, (in the same operator) can use the hint if needed. For example, by extracting the hash-key hint and using it to identify and retrieve the SDP information which has been locally stored.

When an INVITE is received, SBC makes use of the following logic to invoke optimal media routing logic.

(A) First it checks whether the call is a loop-back call or not. This can be checked by one of the following mechanisms. If any of them is true, the call is determined to be a looped-back call.
  (1) It checks whether the call is a loop-back call or not; This can be derived and/or determined based on the contents of Feature-Caps header (Feature Caps:*;+g.3gpp.loopback=<"homenetwork A").
  (2) It checks the identification of the call-leg in the "iotl" parameter and this could be present in Feature-Caps header.

(B) If the call is not a loop-back call, the rest of the steps are skipped. Else, the SBC understands that media can be optimally routed by by-passing previous nodes. It uses the SDP information received on the original ingress call-leg for further processing. This "media-context" could be fetched from a storage device, e.g., memory, a database (DB), etc., using the hint, hash-key hint) that was put in the TRF address (which would be sent by S-CSCF as is for a looped-back call) or using the unknown SDP attribute (if present) or unknown header (if present).
  (1) If and/or when the SBC decides to bypass itself (based on original ingress and egress media-zone/realm configuration), the ingress SDP offer/information is used as an egress SDP offer/information. Once the original SDP offer/information is passed as an offer towards the egress side, the media route and the media transmitted over the media route bypasses the SBC.

Figure 4:
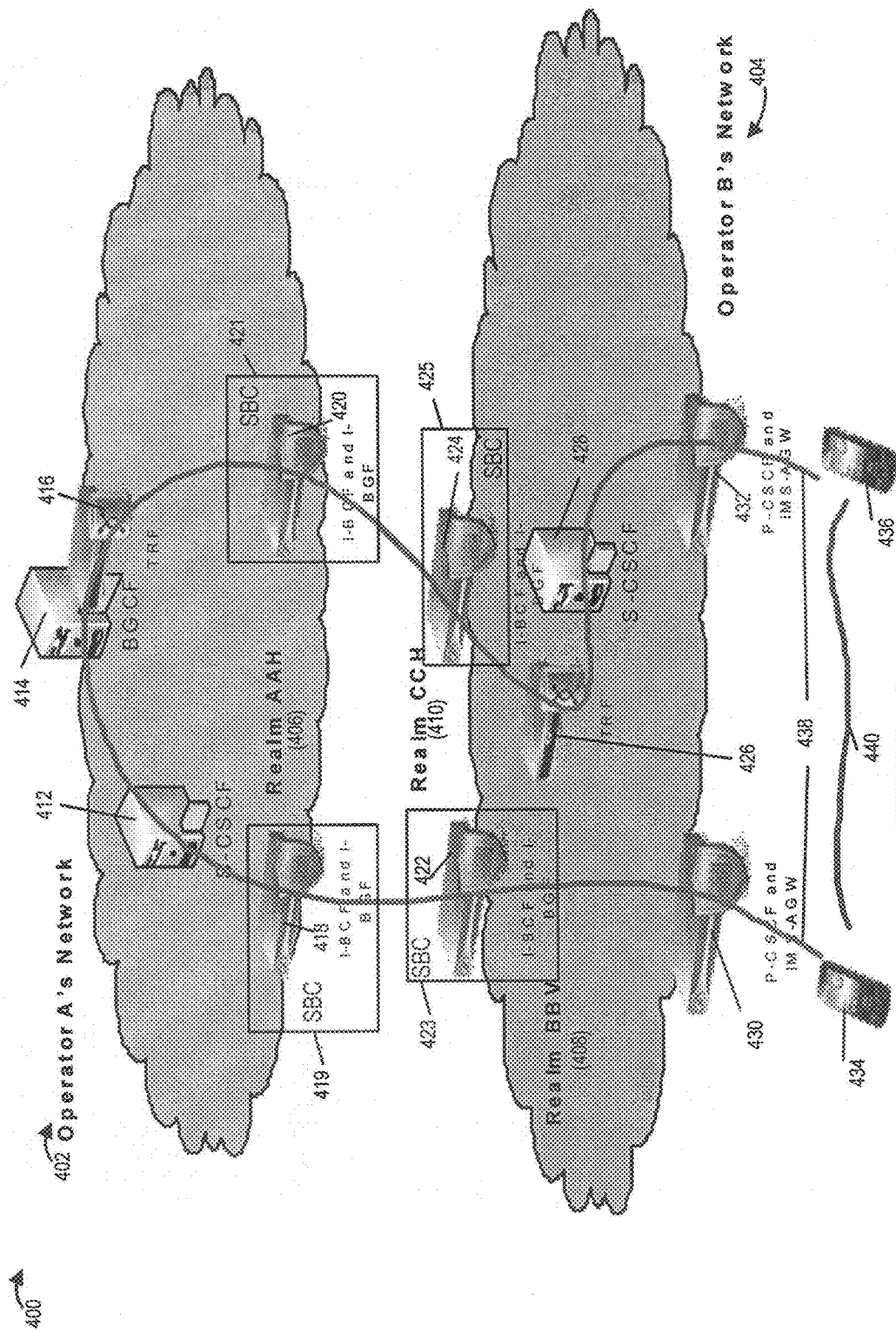
FIG. 4 illustrates a diagram of a call-flow in accordance with an embodiment of the present invention wherein the call is established between a roaming user A and another user, user B, residing in the same network in which user A is roaming.

Drawing 400 of FIG. 4 illustrates another exemplary embodiment of the present invention. Drawing 400 is a high-level block diagram of a call-flow for a case where the call is established between a roaming user A whose home-network is home network A and another user, user B, residing in the same network as that of where user A is roaming. In FIG. 4, operator A's network 402 includes S-CSCF 412, BGCF 414, TRF 416, I-BCF and I-BGF/TrGW 418, I-BCF and I-BGF/TrGW 420 and is the home network for user A. In some embodiments, the functionality of the I-BCF and/or I-BGF/TrGW are included in a session border controller. In such cases, the session border controller acts as an I-BCF and/or I-BGF/TrGW and performs their functions. In some embodiments, I-BCF and I-BGF/TrGW 418 are included in SBC 419. In some embodiments IBC-F and I-BGF/TrGW 420 are included in SBC 421. The Operator A's Network 402 includes realm AAH 406. Operator A's Network 402 realm AAH 406 is coupled to Operator B's Network realm BBV 408 via a third network having a realm CCH 410.

In FIG. 4, Operator B's Network 404 includes P-CSCF and IMS-AGW 430, TRF 426, S-CSCF 428, P-CSCF and IMS-AGW 432, I-BCF and I-BGF/TrGW 422, and I-BCF and I-BGF/TrGW 424. In some embodiments, the functionality of the I-BCF and/or I-BGF/TrGW are included in a session border controller. In such cases, the session border controller acts as an I-BCF and/or I-BGF/TrGW and performs their functions. In some embodiments, I-BCF and I-BGF/TrGW 422 are included in SBC 432. In some embodiments IBC-F and I-BGF/TrGW 424 are included in SBC 425. User A has roamed to and is located in Operator B's Network. User A's device 434, e.g., a mobile device such as a smartphone, is connected to and operating in Operator B's network 404 realm BBV 408. User B is also operating in Operator B's Network 404 in realm BBV 408.

Line 438 illustrates the signaling path for a communications session established between user device 434 and user device 436. Signals travel between user device 434 and user device 436 and traverse Operator B's Network 404 P-CSCF and IMS-AGW 430, SBC 423 (or I-BCF and I-BGF/TrGW 422), realm CCH 410, Operator A Network 402 SBC 419 (or I-BCF and I-BGF/TrGW 418), S-CSCF 412, BGCF 414, TRF 416, SBC 421 (or I-BCF and I-BGF/TrGW 420), Operator B's Network 404 SBC 425 (or I-BCF and I-BGF/TrGW 424), TRF 426, S-CSCF 428, P-SCCF and IMS-AGW 432.

Line 440 illustrates the media path for the media streams of the communications session between the user device 434 and user device 436. It should be noted that media path 440 illustrates that the media streams for the communications session established between user device 434 and user device 436 traverse only Operator B's Network and bypass Operator A's Network.

Figure 5:
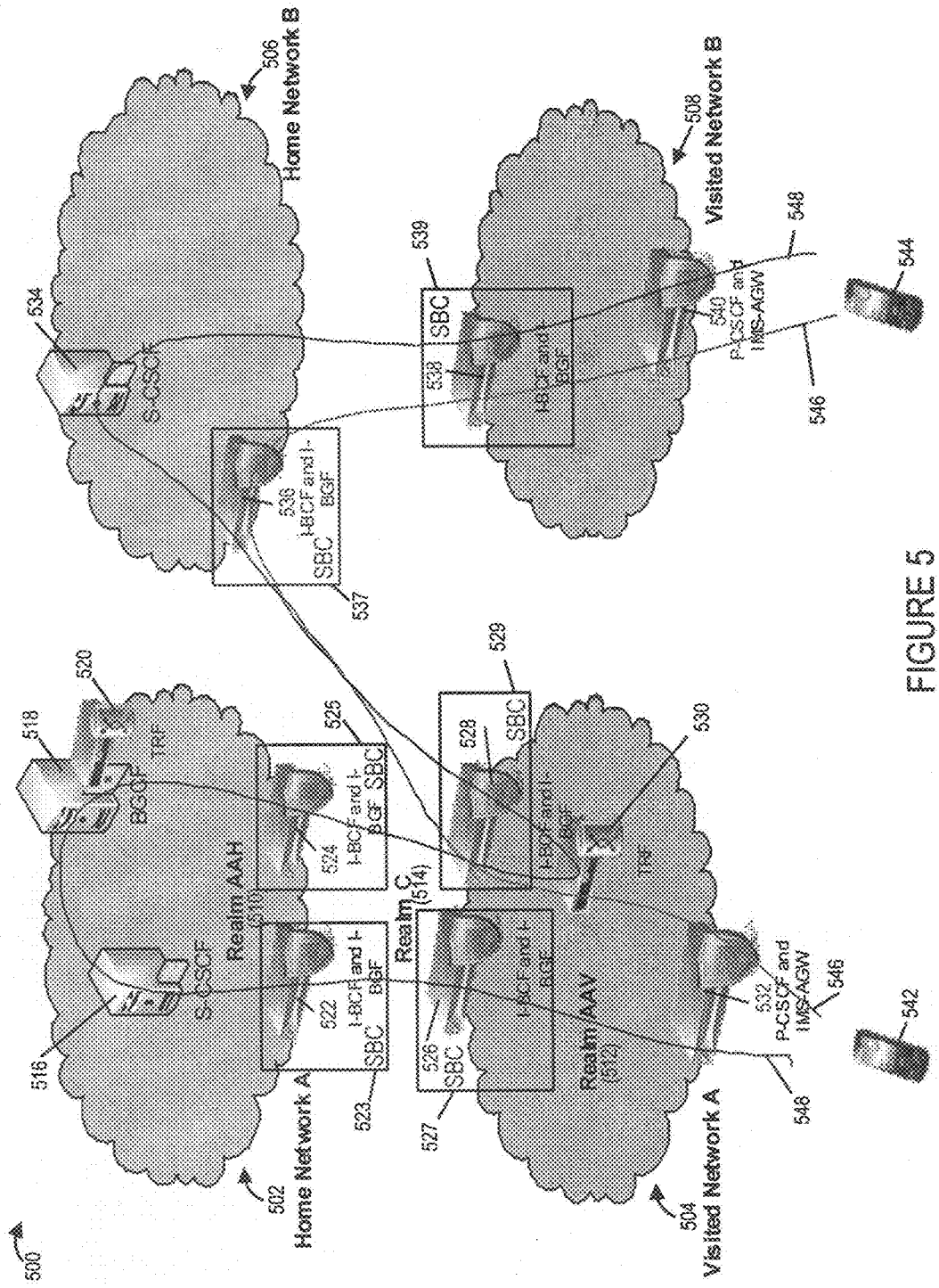
FIG. 5 illustrates a diagram of a call-flow in accordance with an embodiment of the present invention wherein the call is established between a roaming user A and another user roaming user B residing in a different network than that of where user A is roaming.

When the SBC can't bypass itself (since original ingress and egress media-zone/realm are not the same), the SBC will need to be in the path—but intermediate nodes can be bypassed. Drawing 500 of FIG. 5 illustrates another exemplary embodiment of the present invention in which the SBC can't bypass itself since the original ingress and egress media zone/realms are not the same. In the drawing 500 of FIG. 5 user A in visited Network A and user B is in visited Network B which is different than visited network A.

Drawing 500 is a high-level block diagram of a call-flow for a case where the call is established between a roaming user A in visited network A 504 with a home network A 502 and another user, user B, residing in a different network visited network B 508 and having a home network B 506.

In FIG. 5, user A's Home Network A 502 includes S-CSCF 516, BGCF 518, TRF 520, and I-BCF and I-BGF/TrGW 522 and I-BCF and I-BGF/TrGW 524. In some embodiments, the Home Network A 502 includes session border controller 523 that implements I-BCF and I-BGF/TrGW 522. The SBC 523 includes I-BCF and I-BGF/TrGW functionality. In some embodiments, the Home Network A 502 includes session border controller 525 that implements I-BCF and I-BGF/TrGW 524. The SBC 525 includes I-BCF and I-BGF/TrGW functionality. Home Network A 502 includes realm AAH 510.

In FIG. 5, user A's Visited Network A 504 includes realm AAV 512. Realm C 514 is situated between and connects realm AAH 510 and Realm AAV 512. Visited Network A 504 includes I-BCF and I-BGF/TrGW 526, I-BCF and I-BGF/TrGW 528, TRF 530 and P-SCSF and IMS-AGW 532. User A device 542, e.g., a mobile device, has roamed to visited network A 504 and has a Home Network A 502. In some embodiments, the Visited Network A 504 includes session border controller 527 that implements I-BCF and I-BGF/TrGW 526. The SBC 527 includes I-BCF and I-BGF functionality. In some embodiments, the Visited Network A 504 includes session border controller 529 that implements I-BCF and I-BGF 528. The SBC 529 includes I-BCF and I-BGF functionality.

In FIG. 5, user B's Home Network B 506 includes I-BCF and I-BGF/TrGW 536 and S-CSCF 534. In some embodiments, Home Network B 506 includes SBC 537 that implements I-BCF and I-BGF/TrGW 536. The SBC 536 includes I-BCF and I-BGF/TrGFW functionality.

In FIG. 5, user B's Visited Network B 508 includes I-BCF and I-BGF/TrGW 538, P-CSCF and IMS-AGW 540. User B device 544, e.g., a mobile device, has roamed to visited network B 508 and has a Home Network B 506. In some embodiments, Visited Network B 508 includes SBC 539 that implements I-BCF and I-BGF/TrGW 538. SBC 539 includes I-BCF and I-BGF/TrGW functionality.

Line 548 is used to illustrate the signaling path for a communications session between user A device 542 and user B device 544. Line 546 is used to illustrate the media path for the media streams which are part of the communications session between user A device 542 and user B device 544. It should be noted that media path 546 originates at the user A device 542 and traverses the P-CSCF and IMS-AGW 532, the SBC 529 (or I-BCF and I-BGF 528), SBC 537 (or I-I-BCF and I-BGF 536), SBC 539 (or I-I-BCF and I-BGF 538), P-CSCF and IMS-AGW 540 and terminates at user B device 544. The media path bypasses SBC 527 (or I-BCF and I-BGF), S-CSCF 516, BGCF 518, SBC 525 (or I-BCF and I-BGF 524), TRF 530 and S-CSCF 534. The signaling path illustrated by line 548 includes these bypassed nodes/devices and is used to illustrate the signaling path for the communications session.

Exemplary procedures of how to inform intermediate nodes/devices to release local resources will now be discussed. Once the SBC has bypassed intermediaries, they should be informed of the same so that they also release media resources and also do not start mechanisms which may result in the call being torn down or negatively impacted such as for example Real-time Transport Protocol-inactivity (RTP-inactivity) test. Since standard OMR 3GPP procedures are not supported, the c=0.0.0.0 mechanism with OMR 3GPP attributes cannot be used.

Instead in some embodiments of the present invention existing SIP/SDP semantics are used inform intermediate nodes/devices to release local resources, e.g., media resources. Several methods/procedures to achieve this result will now be discussed.

In a first embodiment, for the incoming SIP INVITE request message the SBC responds with a SIP response including an SDP answer with port number 0 for all m-lines. This is an indication that the call is answered—but media is not made active and would be made active later in a subsequent offer/answer exchange. An intermediate node/device which receives this SDP answer releases the media resources reserved for the media stream and also will not start an RTP-inactivity mechanism test for the media stream. This behavior of not invoking RTP-inactivity detection and releasing resources is supported by SBCs implemented in accordance with the present invention and typically by SBCs which are currently commercially available such as SBCs sold by Sonus Networks, Inc. This first embodiment is discussed in further detail below in connection with FIG. 6.

In a second embodiment some nodes may not accept a call with all media streams rejected (port=0). So, for those cases, the SDP answer can be sent with c=0.0.0.0 for all m=lines. This is a valid behavior as per RFC 4317 (Section 5.3). This is an indication that the call is answered and RTP is not active towards peer; so, the RTP inactivity is not started. But this has to be done in both the directions, so, this is immediately followed by a re-INVITE from the ingress side with c=0.0.0.0 for all m-lines. This indicates and/or enables intermediate nodes to release media resources and also not to start a RTP-inactivity mechanism procedure for the media streams corresponding to the communication session. This behavior of not invoking RTP-inactivity detection and releasing resources is supported by SBCs implementing the invention. Such behavior is also typically supported by currently commercially available SBCs such as those sold by Sonus Networks, Inc. Also, these scenarios are explicitly mentioned in RFCs in the form of examples too. This second embodiment is discussed in further detail below in connection with FIG. 7.

Figure 6:
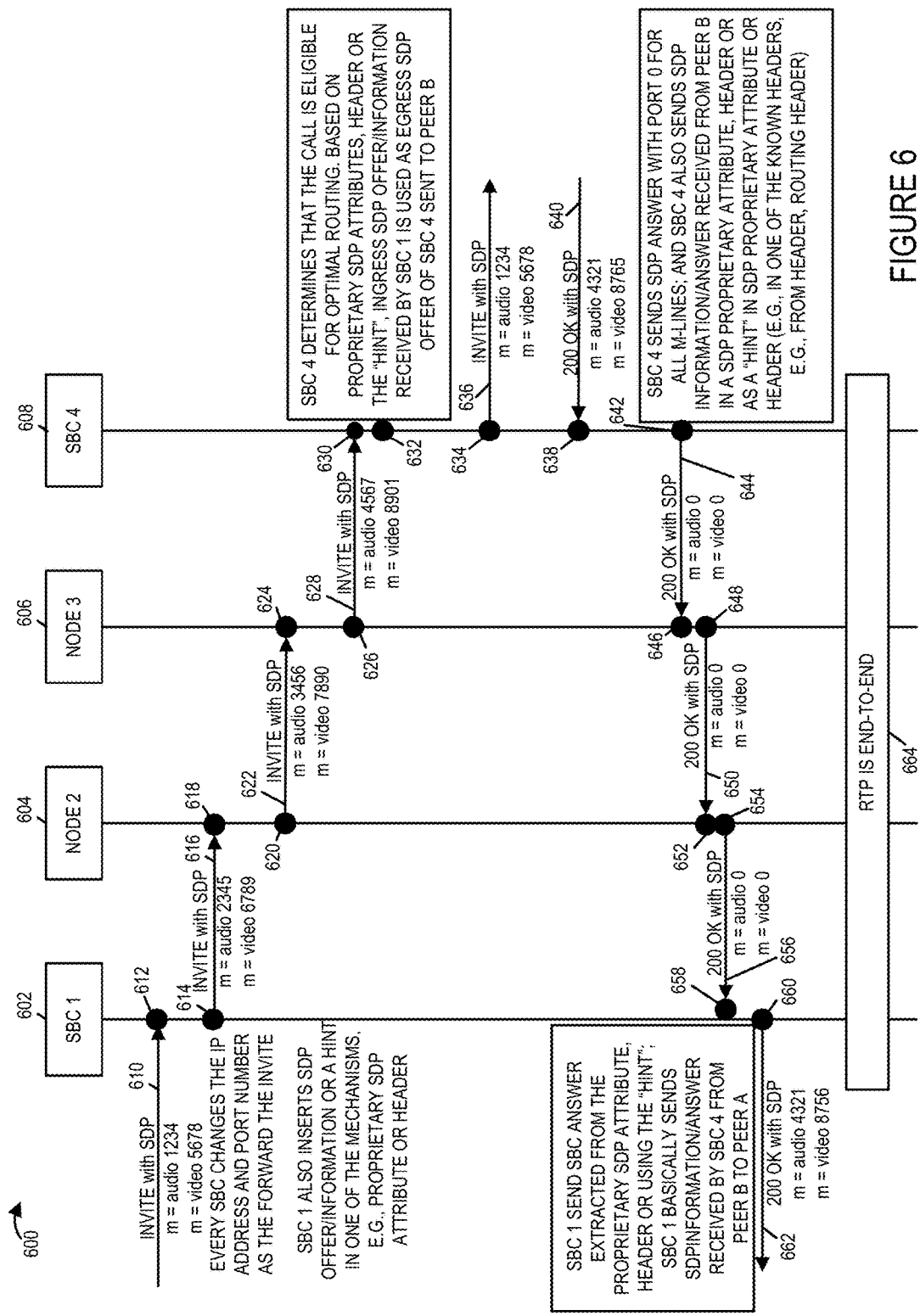
FIG. 6 illustrates exemplary signaling in an exemplary communications system in accordance with an exemplary embodiment.

FIG. 6 is a drawing 600 illustrating exemplary signaling in an exemplary communications system in accordance with an exemplary embodiment. The exemplary communications system includes session border controller (SBC) 1 602, node 2 604, node 3 606, and SBC 4 608. The SBCs (SBC 1 602, SBC 4 608) are implemented in accordance with the present invention. In step 612 ingress SBC 1 602 receives SIP Invite message 610 and recovers the information communication in message 610. The SIP Invite message 610 is, e.g., to initiate a call session, e.g., a Voice Over Internet Protocol (VOIP) multi-media video conferencing session being offered by Peer A to Peer B. The SIP Invite message 610 includes a SDP offer message which includes the description of the session being offered, e.g., by Peer A to Peer B, e.g., UE 1 to UE 2. IETF RFC 4566 describes the SDP Session Description Protocol. The SDP message which includes the session description generally includes the following information the session name and purpose, time(s) the session is active, the media comprising the session and information needed to receive the media such as for example, addresses, ports, and formats. With respect to the media and transport information, the SDP message includes information describing the type of media such as for example audio, video and image media data, the transport protocol such as for example Real-time Transport Protocol (RTP)/User Datagram Protocol (UDP)/Internet Protocol (IP), etc. and the format of the media such as for example, H.261 video, MPEG video, etc. In addition, the SDP message includes the address and port details to which the media data is sent, e.g., the remote IP address and remote port to which the media is being sent. The SDP session description contains a number of lines of text of the form: <type>=<value>. For example, "m=<media> <proto> <fmt>" refers to the media information describing a particular media stream. <media> is the media type which include "audio", "video", "text", "application", and "message." <port> is the transport port to which the media stream is to be sent. <proto> is the transport protocol and <fmt> is the media format description. Some of the fields and/or attributes of the SDP messages included in SIP Invite message 610 are shown in FIG. 6. For ease of explanation and clarity only some of the SDP message fields and attributes are shown and described in connection with the figures of the application and the format of the fields and attributes are provided are exemplary and representative. The SDP message fields of the SIP Invite message 610 are m=audio 1234, m=video 5678. The m=audio 1234 field indicates that the session is to include an audio stream, the port address to which the stream is to be sent is 1234. The m=video 5678 attribute indicates that the session is to include a video media stream, port address is 5678.

Operation proceeds from step 612 to step 614. In step 614 SBC 1 602 generates and transmits SIP invite message 616 including an SPD offer message. The SDP message fields of the SIP Invite message 616 include m=audio 2345, m=video 6789. The m=audio 2345 field indicates that the session is to include an audio stream, the port address to which the stream is to be sent is 2345. The m=video 6789 attribute indicates that the session is to include a video media stream, port address is 6789. SBC 1 602, e.g., acting as IBCF or IPX proxy, also inserts SDP information or a hint in the SIP Invite message 616. For example, in some embodiments, the SDP information or the hint is inserted in a proprietary header of SIP Invite message 616. In some other embodiments, the SDP information or the hint is inserted in a proprietary attribute of the SDP offer message in the SIP Invite message 616. Operation proceeds from step 614 to step 618.

In step 618 node 2 604 receives SIP Invite message 616 and recovers the information communicated in message 616. Operation proceeds from step 618 to step 620. In step 620 node 2 604 generates and transmits SIP invite message 622 including an SDP offer message. The SDP message fields of the SIP Invite message 622 include m=audio 3456, m=video 7890. The m=audio 3456 field indicates that the session is to include an audio stream, and the port address to which the stream is to be sent is 3456. The m=video 7890 attribute indicates that the session is to include a video media stream, and port address is 7890. Node 2 604 also includes the SDP information or the hint from ingress SDP 1 602 in SIP Invite message 622. Operation proceeds from step 620 to step 624.

In step 624 node 3 606 receives SIP Invite message 622 and recovers the information communicated in message 622. Operation proceeds from step 624 to step 626. In step 626 node 3 606 generates and transmits SIP invite message 628 including an SDP offer message. The SDP message fields of the SIP Invite message 628 include m=audio 4567, m=video 8901. The m=audio 4567 field indicates that the session is to include an audio stream, and the port address to which the stream is to be sent is 4567. The m=video 8901 attribute indicates that the session is to include a video media stream, and port address is 8901. Node 3 606 also includes the SDP information or the hint from ingress SDP 1 602 in SIP Invite message 628. Operation proceeds from step 626 to step 630.

In step 630 SBC 4 608 receives SIP Invite message 628 and recovers the information communicated in message 628. Operation proceeds from step 630 to step 632.

In step 632 SBC 4 determines that the call is eligible for optimal routing based on proprietary SDP attributes or the hint; and ingress SDP of SBC 1 is used as egress SDP. Operation proceeds from step 632 to step 634.

In step 634, SBC 4 608 generates and transmits SIP Invite message 636 including an SDP offer message, e.g., to peer B, e.g., a UE device 2. The SDP message fields of the SIP Invite message 636 include m=audio 1234, m=video 5678. The m=audio 1234 field indicates that the session is to include an audio stream, the port address to which the stream is to be sent is 1234. The m=video 5678 attribute indicates that the session is to include a video media stream, port address is 5678. Operation proceeds from step 634 to step 638.

In step 638 SBC 4 608 receives SIP 200 OK response message 640 including an SDP answer message and recovers the information communicated in message 640. The SDP answer message fields of the SIP 200 OK response message 640 include m=audio 4321, m=video 8765. The m=audio 4321 field indicates that the session is to include an audio stream, the port address to which the stream is to be sent is 4321. The m=video 8765 attribute indicates that the session is to include a video media stream, port address is 8765. Operation proceeds from step 638 to step 642.

In step 642 SBC 4 608 generates and transmits SIP 200 OK response message 644 including an SDP answer message. The SDP message fields of the SIP 200 OK response message 644 include m=audio 0, m=video 0. The SDP answer message in SIP 200 OK response message 644 includes port 0 for all m-lines. SBC 4 608 also inserts SDP information or a hint in the SIP 200 OK response message 644. For example, in some embodiments, the SDP information or the hint is inserted in a proprietary header of SIP 200 OK response message 644. In some other embodiments, the SDP information or the hint is inserted in a proprietary attribute of the SDP answer message in the SIP 200 OK response message 644. Operation proceeds from step 642 to step 646. This SDP information corresponds to the SDP answer received from UE B.

In step 646 node 3 606 receives SIP 200 OK response message 644 including an SDP answer message and recovers the information communicated in message 644. Operation proceeds from step 646 to step 648. In step 648, node 3 606 generates and transmits SIP 200 OK response message 650 including an SDP answer message. The SDP message fields of the SIP 200 OK response message 650 include m=audio 0, m=video 0. Node 3 606 also includes the SDP information or the hint from SBC 4 608 in SIP 200 OK message 650. Operation proceeds from step 648 to step 652.

In step 652 node 2 604 receives SIP 200 OK response message 650 including an SDP answer message and recovers the information communicated in message 650. Operation proceeds from step 652 to step 654. In step 654, node 2 604 generates and transmits SIP 200 OK response message 656 including an SDP answer message. The SDP message fields of the SIP 200 OK response message 656 include m=audio 0, m=video 0. Node 2 604 also includes the SDP information or the hint from SBC 4 608 in SIP 200 OK response message 656. Operation proceeds from step 654 to step 658.

In step 658 SBC 1 602 receives SIP 200 OK response message 656 including an SDP answer message and recovers the information communicated in message 650. Operation proceeds from step 658 to step 660. In step 660, SBC 1 602 generates and transmits SIP 200 OK response message 662 including an SDP answer message, e.g., to peer A. The SDP message fields of the SIP 200 OK response message 662 include m=audio 4321, m=video 8756. SBC 1 602 recovers SDP answer information which it includes in the generated SIP 200 OK response message 662 from the received SDP information or the hint from SBC 4 608 which was included in received 200 OK response message 656. SBC 1 602 basically sends the SDP answer as received by SBC 4 in SIP 200 OK message 640.

Figure 7:
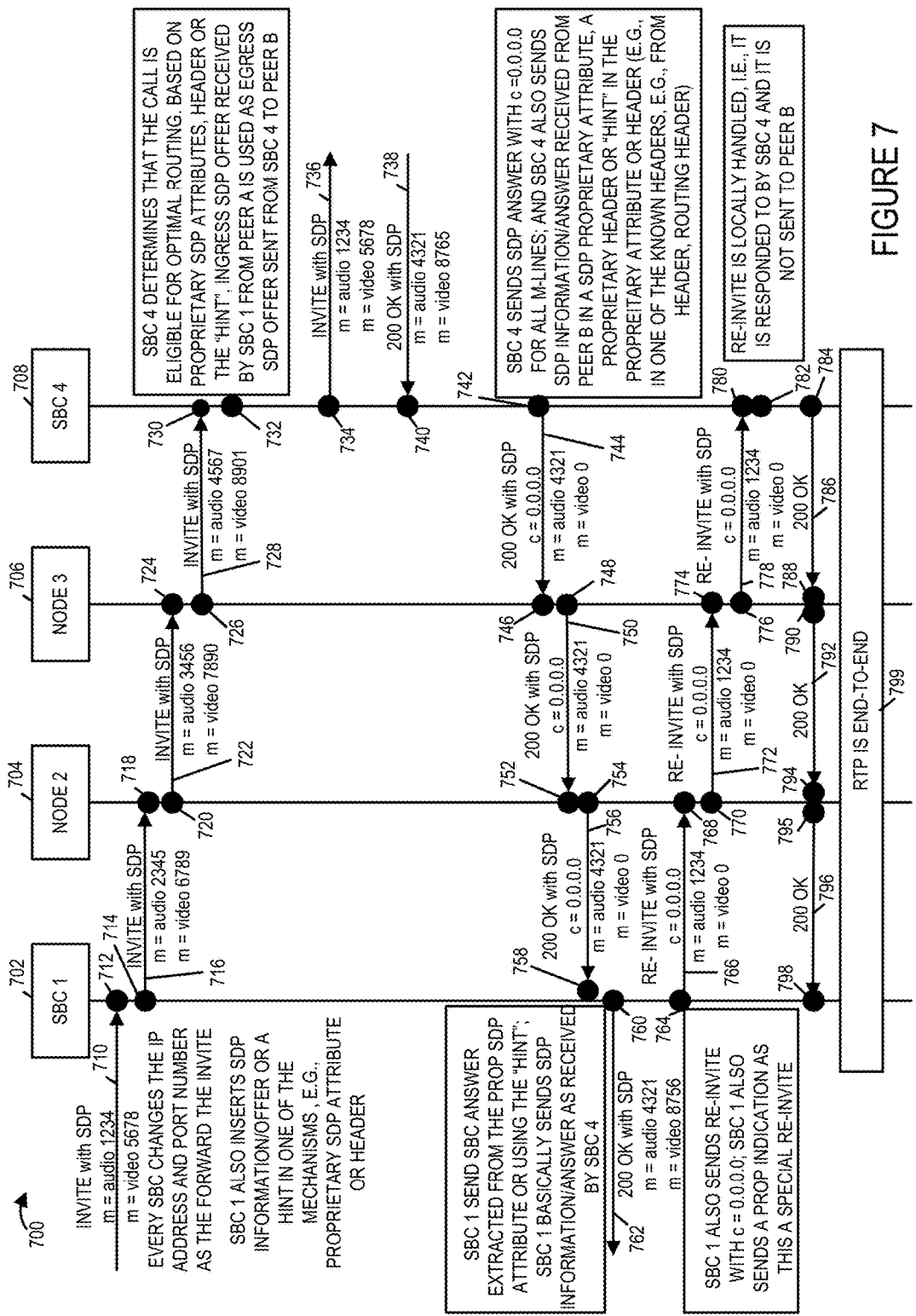
FIG. 7 illustrates exemplary signaling in an exemplary communications system in accordance with an exemplary embodiment.

FIG. 7 is a drawing 700 illustrating exemplary signaling in an exemplary communications system in accordance with an exemplary embodiment. The exemplary communications system includes session border controller (SBC) 1 702, node 2 704, node 3 706, and SBC 4 708. The SBCs (SBC 1 702, SBC 4 708) are implemented in accordance with the present invention. In step 712 ingress SBC 1 702 receives SIP Invite message 710 and recovers the information communication in message 710. The SIP Invite message 710 is, e.g., to initiate a call session, e.g., a Voice Over Internet Protocol (VOIP) multi-media video conferencing session being offered by Peer A to Peer B. The SIP Invite message 710 includes a SDP offer message which includes the description of the session being offered, e.g., by Peer A to Peer B, e.g., UE 1 to UE 2. IETF RFC 4566 describes the SDP Session Description Protocol. The SDP message which includes the session description generally includes the following information the session name and purpose, time(s) the session is active, the media comprising the session and information needed to receive the media such as for example, addresses, ports, and formats. With respect to the media and transport information, the SDP message includes information describing the type of media such as for example audio, video and image media data, the transport protocol such as for example Real-time Transport Protocol (RTP)/User Datagram Protocol (UDP)/Internet Protocol (IP), etc. and the format of the media such as for example, H.261 video, MPEG video, etc. In addition, the SDP message includes the address and port details to which the media data is sent, e.g., the remote IP address and remote port to which the media is being sent. The SDP session description contains a number of lines of text of the form: <type>=<value>. For example, "m=<media> <proto> <fmt>" refers to the media information describing a particular media stream. <media> is the media type which include "audio", "video", "text", "application", and "message." <port> is the transport port to which the media stream is to be sent. <proto> is the transport protocol and <fmt> is the media format description. Some of the fields and/or attributes of the SDP messages included in SIP Invite message 710 are shown in FIG. 7. For ease of explanation and clarity only some of the SDP message fields and attributes are shown and described in connection with the figures of the application and the format of the fields and attributes are provided are exemplary and representative. The SDP message fields of the SIP Invite message 710 are m=audio 1234, m=video 5678. The m=audio 1234 field indicates that the session is to include an audio stream, the port address to which the stream is to be sent is 1234. The m=video 5678 attribute indicates that the session is to include a video media stream, port address is 5678.

Operation proceeds from step 712 to step 714. In step 714 SBC 1 702 generates and transmits SIP invite message 716 including an SDP offer message. The SDP message fields of the SIP Invite message 716 include m=audio 2345, m=video 6789. The m=audio 2345 field indicates that the session is to include an audio stream, the port address to which the stream is to be sent is 2345. The m=video 6789 attribute indicates that the session is to include a video media stream, port address is 6789. SBC 1 702, e.g., acting as IBCF or IPX proxy, also inserts SDP information or a hint in the SIP Invite message 716. For example, in some embodiments, the SDP information or the hint is inserted in a proprietary header of SIP Invite message 716. In some other embodiments, the SDP information or the hint is inserted in a proprietary attribute of the SDP offer message in the SIP Invite message 716. Operation proceeds from step 714 to step 718. This SDP information corresponds to SDP offer received from UE A.

In step 718 node 2 704 receives SIP Invite message 716 and recovers the information communicated in message 716. Operation proceeds from step 718 to step 720. In step 720 node 2 704 generates and transmits SIP invite message 722 including an SDP offer message. The SDP message fields of the SIP Invite message 722 include m=audio 3456, m=video 7890. The m=audio 3456 field indicates that the session is to include an audio stream, and the port address to which the stream is to be sent is 3456. The m=video 7890 attribute indicates that the session is to include a video media stream, and port address is 7890. Node 2 704 also includes the SDP information or the hint from ingress SDP 1 702 in SIP Invite message 722. Operation proceeds from step 720 to step 724.

In step 724 node 3 606 receives SIP Invite message 722 and recovers the information communicated in message 722. Operation proceeds from step 724 to step 726. In step 726 node 3 706 generates and transmits SIP invite message 728 including an SDP offer message. The SDP message fields of the SIP Invite message 728 include m=audio 4567, m=video 8901. The m=audio 4567 field indicates that the session is to include an audio stream, and the port address to which the stream is to be sent is 4567. The m=video 8901 attribute indicates that the session is to include a video media stream, and port address is 8901. Node 3 706 also includes the SDP information or the hint from ingress SDP 1 702 in SIP Invite message 728. Operation proceeds from step 726 to step 730.

In step 730 SBC 4 708 receives SIP Invite message 728 and recovers the information communicated in message 728. Operation proceeds from step 730 to step 732.

In step 732 SBC 4 708 determines that the call is eligible for optimal routing based on proprietary SDP attributes or the hint; and ingress SDP of SBC 1 is used as egress SDP. Operation proceeds from step 732 to step 734.

In step 734, SBC 4 708 generates and transmits SIP Invite message 736 including an SDP offer message, e.g., to peer B, e.g., UE device 2. This SDP offer is generated based on the SDP offer received in INVITE message. The SDP message fields of the SIP Invite message 736 include m=audio 1234, m=video 5678. The m=audio 1234 field indicates that the session is to include an audio stream, the port address to which the stream is to be sent is 1234. The m=video 5678 attribute indicates that the session is to include a video media stream, port address is 5678. Operation proceeds from step 734 to step 740.

In step 740 SBC 4 708 receives SIP 200 OK response message 738 including an SDP answer message and recovers the information communicated in message 738. The SDP answer message fields of the SIP 200 OK response message 738 include m=audio 4321, m=video 8765. The m=audio 4321 field indicates that the session is to include an audio stream; the port address to which the stream is to be sent is 4321. The m=video 8765 attribute indicates that the session is to include a video media stream; port address is 8765. Operation proceeds from step 740 to step 742.

In step 742 SBC 4 708 generates and transmits SIP 200 OK response message 744 including an SDP answer message. The SDP answer of the SIP 200 OK response message 744 includes c=0.0.0.0 for all m-lines. The SDP message fields of the SIP 200 OK response message 744 includes c=0.0.0,0, m=audio 4321, m=video 0. SBC 4 708 also inserts SDP information or a hint in the SIP 200 OK response message 744. This hint/SDP information is generated based on the received SDP offer from UE 2. For example, in some embodiments, the SDP information or the hint is inserted in a proprietary header of SIP 200 OK response message 744. In some other embodiments, the SDP information or the hint is inserted in a proprietary attribute of the SDP answer message in the SIP 200 OK response message 744. Operation proceeds from step 742 to step 746.

In step 746 node 3 706 receives SIP 200 OK response message 744 including an SDP answer message and recovers the information communicated in message 744. Operation proceeds from step 746 to step 748. In step 748, node 3 706 generates and transmits SIP 200 OK response message 750 including an SDP answer message. The SDP message fields of the SIP 200 OK response message 750 include c=0.0.0.0, m=audio 4321, m=video. Node 3 706 also includes the SDP information or the hint from SBC 4 708 in SIP 200 OK message 750. Operation proceeds from step 748 to step 752.

In step 752 node 2 704 receives SIP 200 OK response message 750 including an SDP answer message and recovers the information communicated in message 750. Operation proceeds from step 752 to step 754.

Node 2 704 also includes the SDP information or the hint from SBC 4 708 in SIP 200 OK response message 756. Operation proceeds from step 754 to step 758.

In step 758 SBC 1 702 receives SIP 200 OK response message 756 including an SDP answer message and recovers the information communicated in message 750. Operation proceeds from step 758 to step 760. In step 760, SBC 1 702 generates and transmits SIP 200 OK response message 762 including an SDP answer message, e.g., to peer A. The SDP message fields of the SIP 200 OK response message 762 include m=audio 4321, m=video 8756. SBC 1 702 recovers SDP answer information which it includes in the generated SIP 200 OK response message 762 from the received SDP information or the hint from SBC 4 708 which was included in received 200 OK response message 756. SBC 1 702 basically sends the SDP answer as received by SBC 4 in SIP 200 OK response message 738. Operation proceeds from step 760 to step 764.

In step 764 SBC 1 702 generates and sends a SIP Re-Invite message 766 including an SDP offer message. The SDP message fields of the SIP Re-Invite message 766 includes c=0.0.0.0 as connection address, m=audio 1234, m=video 0. SBC 1 702 also includes in SIP Re-Invite Message 766 a proprietary indication indicating that this is a special Re-Invite message. Operation proceeds from step 764 to step 768.

In step 768 node 2 704 receives SIP Re-Invite message 766 and recovers the information communicated in message 766. Operation proceeds from step 768 to step 770. In step 770 node 2 704 generates and transmits SIP Re-Invite message 772 including an SDP offer message. The SDP message fields of the SIP Re-Invite message 772 include c=0.0.0.0 as connection address, m=audio 1234, m=video 0. Node 2 704 also includes in SIP Re-Invite message 772 the proprietary indication from SBC 1 702 indicating that this is a special Re-Invite message. Operation proceeds from step 770 to step 774.

In step 774 node 3 706 receives SIP Re-Invite message 772 and recovers the information communicated in message 772. Operation proceeds from step 774 to step 776. In step 776 node 3 706 generates and transmits SIP Re-Invite message 778 including an SDP offer message. The SDP message fields of the SIP Re-Invite message 778 include c=0.0.0.0 as connection address, m=audio 1234, m=video 0. Node 3 706 also includes in SIP Re-Invite message 778 the proprietary indication from SBC 1 702 indicating that this is a special Re-Invite message. Operation proceeds from step 776 to step 780.

In step 780 SBC 4 708 receives SIP Re-Invite message 778 and recovers the information communicated in message 778. Operation proceeds from step 780 to step 782. In step 782 SBC4 708 determines that the Re-Invite is to be locally handled. Operation proceeds from step 782 to step 784.

In step 784 SBC 4 708 generates and transmits SIP 200 OK response message 786. In step 788 node 3 706 receives SIP 200 OK response message 786. In step 790 node 3 706 generates and transmits SIP 200 OK response message 792. In step 794 node 2 704 receives SIP 200 OK response message 792. In step 794 node 2 704 generates and transmits SIP 200 OK response message 796. In step 798 SBC 1 702 receives SIP 200 OK response message 796.

Drawing 900 of FIG. 9 is an example of how a proprietary header may be, and in some embodiments is, used to communicate the ingress SDP or Hint. The X-sonus-OMR-Info proprietary header illustrated in drawing 900 of FIG. 9 is "X-sonus-OMR-Info: v=0;m=0;z=1;b=9;p=216.110.2.31; a=default;l=225;

s=ez9&xzRMaRK5a807.831.7.787&zigkn k:81aT270/ 1999& zungk:81a mmvcyzml& zigkn k:872agvovkslmv-vevmg/1999& zungk:872a9-84& zhvmwivxe& zn ckgmv: 849&;".

In some embodiments, the original SDP offer received at SBC 1 is sent from SBC 1 to SBC 4 in a proprietary SDP attribute or as a hint in one of the known headers, e.g., the Route header.

" "The "X-Sonus-OMR-Info" header may be included in the outgoing SIP message and it would have the original SDP. This SDP information is transmitted in a compressed/encoded format to save bandwidth and for preventing manipulation. For example in MRF cases, the originating SBC can include this header and it is expected to get this SDP information back in the reply message so that the originating SBC can identify from the reply if the transcoding has happened or not.

In another embodiment, SBC 4 sends the SDP answer as is—but exchange UPDATE/re-INVITE with port 0 between the two SBCs therein informing the intermediary devices that no media is to be routed through devices but that they are to be bypassed.

Mechanisms/Procedures for how to inform SDP answer from SBC 4 to SBC 1 so that media bypass is achieved end-to-end will now be discussed. Similar to the procedure used to transmit the SDP offer from SBC 1 to SBC 4 may be, and in some embodiments is, used. That is the original SDP answer can be sent from SBC 4 to SBC 1 in a proprietary SDP attribute or a proprietary SIP header or as a hint in one of the known headers, e.g., the Route header.

In another embodiment of the present invention, the media release mechanism and procedures described above are used to release resources in MRF-transcoding scenarios. Various embodiments are applicable to the scenario where MRF (Media Resource Function device) is invoked for transcoding using B2BUA (Back-to-Back User Agent)-mode of invocation. The signaling drawing 800 will now be used to illustrate exemplary signaling in accordance with an embodiment of the present invention in which resources of a MRF device is released by procedures implemented in accordance with an embodiment of the invention.

Figure 8:
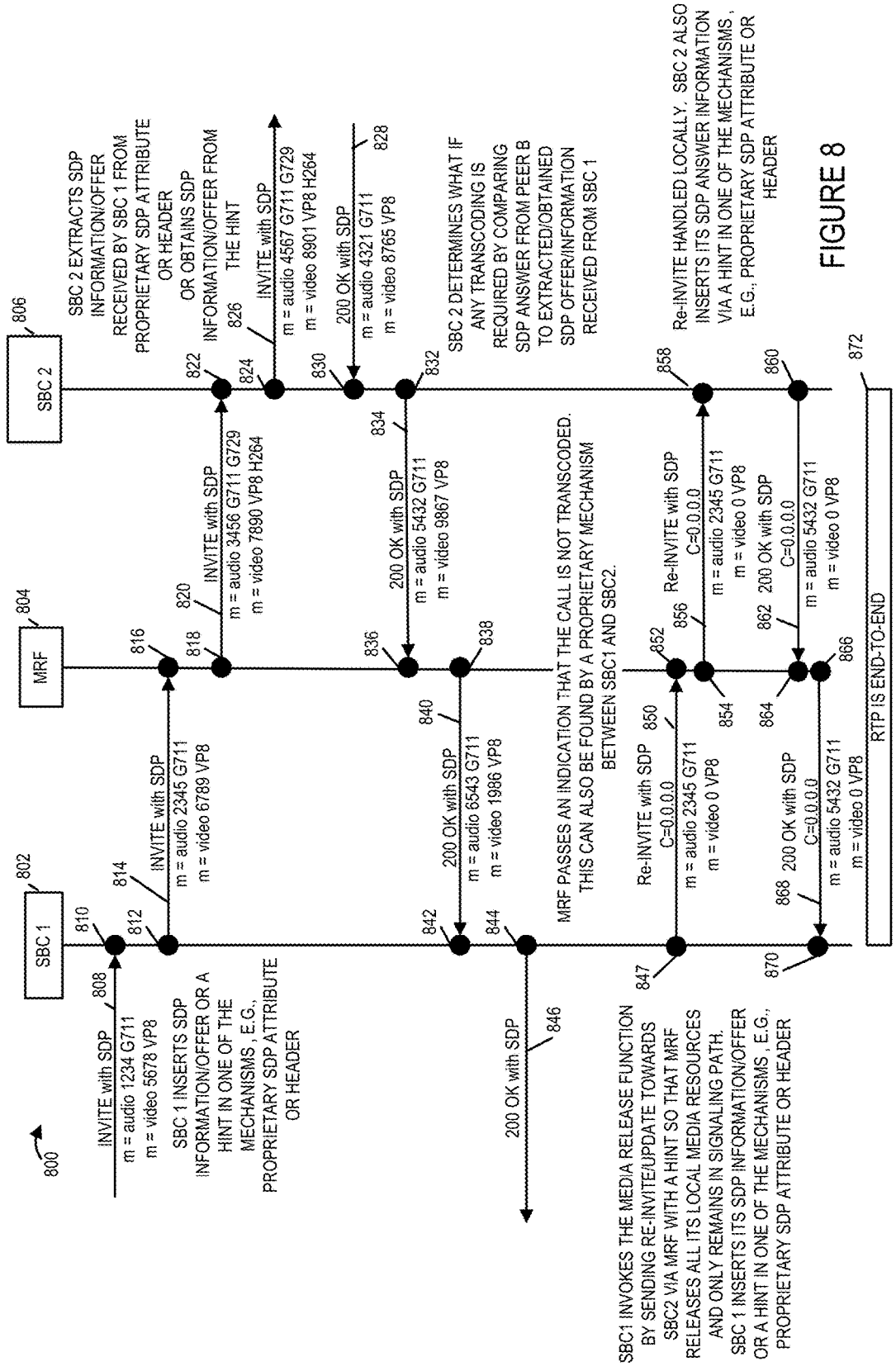
FIG. 8 illustrates exemplary signaling in an exemplary communications system in accordance with an exemplary embodiment.

FIG. 8 is a drawing 800 illustrating exemplary signaling in an exemplary communications system in accordance with an exemplary embodiment. The exemplary communications system includes session border controller SBC 1 802, Media Resource Function (MRF) 804, and SBC 2 806. The SBCs (SBC 1 802, SBC 2 806) are implemented in accordance with the present invention.

In the exemplary call/session flow illustrated in FIG. 8, the media streams of the established call/session bypass the MRF 804 but do not bypass SBC-1 802 and SBC-2 806. The MRF 804 is bypassed because transcoding is not required for the call session. In the example illustrated in FIG. 8, the MRF 804 resources are bypassed using procedures similar to those shown and described in connection with FIG. 7 wherein the connection value is set to c=0.0.0.0 for maximum interoperability. Though not shown in FIG. 8, in some embodiments, the procedures for releasing intermediary nodes illustrated in connection with FIG. 6 are implemented to release the MRF 804 resources.

In step 810 ingress SBC 1 802 receives SIP Invite message 808 and recovers the information communication in message 808. The SIP Invite message 808 is, e.g., to initiate a call session, e.g., a Voice Over Internet Protocol (VOIP) multi-media video conferencing session being offered by Peer A to Peer B. The SIP Invite message 808 includes a SDP offer message which includes the description of the session being offered, e.g., by Peer A to Peer B, e.g., UE 1 to UE 2. IETF RFC 4566 describes the SDP Session Description Protocol. The SDP message which includes the session description generally includes the following information the session name and purpose, time(s) the session is active, the media comprising the session and information needed to receive the media such as for example, addresses, ports, and formats. With respect to the media and transport information, the SDP message includes information describing the type of media such as for example audio, video and image media data, the transport protocol such as for example Real-time Transport Protocol (RTP)/User Datagram Protocol (UDP)/Internet Protocol (IP), etc. and the format of the media such as for example, H.261 video, MPEG video, etc. In addition, the SDP message includes the address and port details to which the media data is sent, e.g., the remote IP address and remote port to which the media is being sent. The SDP session description contains a number of lines of text of the form: <type>=<value>. For example, "m=<media> <proto> <fmt>" refers to the media information describing a particular media stream. <media> is the media type which include "audio", "video", "text", "application", and "message." <port> is the transport port to which the media stream is to be sent. <proto> is the transport protocol and <fmt> is the media format description. Some of the fields and/or attributes of the SDP messages included in SIP Invite message 808 are shown in FIG. 8. For ease of explanation and clarity only some of the SDP message fields and attributes are shown and described in connection with the figures of the application and the format of the fields and attributes are provided are exemplary and representative. The SDP message fields of the SIP Invite message 808 are m=audio 1234 RTP/AVP G711, m=video 5678 RTP/AVP VP8. The m=audio 1234 RTP/AVP G711 field indicates that the session is to include an audio stream, the port address to which the stream is to be sent is 1234 and that the audio stream is encoded in a G.711 ITU-T standard codec format. The m=video 5678 RTP/AVP VP8 attribute indicates that the session is to include a video media stream, port address is 5678 and the video is encoded in open source VP8 video compression format. Operation proceeds from step 810 to step 812.

In step 812 SBC 1 802 received SIP Invite message 808 and recovers the information communicated in the message. In step 812 SBC 1 generates and transmits SIP invite message 814 including an SDP offer message. The SDP message fields of the SIP Invite message 814 include m=audio 2345 RTP/ATV G711, m=video 6789 RTP/ATV VP8. The m=audio 2345 RTP/AVP G711 field indicates that the session is to include an audio stream, the port address to which the stream is to be sent is 2345 and that the audio stream is encoded in a G.711 ITU-T standard codec format. The m=video 6789 RTP/AVP VP8 attribute indicates that the session is to include a video media stream, port address is 6789 and the video is encoded in open source VP8 video compression format. Operation proceeds from step 812 to step 816.

In step 816 MRF 804 receives SIP Invite message 814 and recovers the information communicated in the message. In step 818 MRF 804 generates and transmits SIP invite message 820 including an SDP offer message. The SDP message fields of the SIP Invite message 820 include m=audio 3456 RTP/AVP G711 G729, m=video 7890 RTP/AVP VP8 H264. The m=audio 3456 RTP/AVP G711 G729 field indicates that the session is to include an audio stream, the port address to which the stream is to be sent is 3456 and that the audio stream is encoded in a G711 or G.729 standard codec format. The m=video 7890 RTP/AVP VP8 H264 attribute indicates that the session is to include a video media stream, port address is 7890 and the video is encoded in open source VP8 video compression format or in H264 video compression format. Operation proceeds from step 818 to step 822.

In step 822 SBC 2 806 receives SIP Invite message 820 and recovers the information communicated in the message. In step 824 SBC 2 806 generates and transmits SIP invite message 826, e.g., to peer B, e.g., a UE device, SIP Invite message 826 including an SDP offer message. The SDP message fields of the SIP Invite message 822 include m=audio 4567 RTP/ATV G711 G729, m=video 8901 RTP/ATV VP8 H264. The m=audio 4567 RTP/AVP G711 G729 field indicates that the session is to include an audio stream, the port address to which the stream is to be sent is 4567 and that the audio stream is encoded in a G.711 ITU-T standard codec format or in G.729 standard codec format. The m=video 8901 RTP/AVP VP8 VP8 H264 attribute indicates that the session is to include a video media stream, port address is 8901 and the video is encoded in open source VP8 video compression format or in H264 video compression format. Operation proceeds from step 824 to step 830.

In step 830 SBC 2 806 receives SIP 200 OK response message 828 including an SDP answer message and recovers the information communicated in the message 828. The SDP answer of the SIP 200 OK response message 828 includes m=audio 4321 RTP/AVP G711, m=video 8765 RTP/AVP VP8. Operation proceeds from step 830 to step 832. In step 832, SBC 2 806 generates and transmits SIP 200 OK response message 834 including an SDP answer message. The SDP message fields of the SIP 200 OK response message 834 include m=audio 5432 G711, m=video 9867 VP8. Operation proceeds from step 832 to step 836.

In step 836 MRF 804 receives SIP 200 OK response message 834 including an SDP answer message and recovers the information communicated in the message 834. Operation proceeds from step 836 to step 838. In step 838, MRF 804 generates and transmits SIP 200 OK response message 840 including an SDP answer message. The SDP message fields of the SIP 200 OK response message 840 include m=audio 6534 G711, m=video 1986 VP8. Operation proceeds from step 838 to step 842.

In step 842 SBC 1 802 receives SIP 200 OK response message 840 including an SDP answer message and recovers the information communicated in the message 840. Operation proceeds from step 842 to step 844 and step 847. In step 844, SBC 1 802 generates and transmits SIP 200 OK response message 846 including an SDP answer message, e.g., to peer A. The MRF 804 passes an indication that the call is not transcoded. This can also be found by a proprietary mechanism between SBC 1 802 and SBC 2 806. SBC 1 invokes the media release function by send re-invite/update towards SBC 2 806 so that MFR 804 releases all its local media resources and only remains in the signaling path.

In step 847 SBC 1 invokes the media release procedure by generating and sending SIP re-Invite message with SDP offer message 850. In the SDP offer message the connection field is set to C=0.0.0.0, m=audio 2345 G711, m=video 0 VP 8 to MRF 804. SIP re-Invite message 850 includes SBC 1 SDP information/offer or a hint from which the SBC 1 SDP offer/information may be obtained in a proprietary attribute or SIP proprietary header. In some embodiments, a SIP update message with SDP offer message is generated and sent in place of the SIP re-Invite message 850. Operation proceeds from step 847 to step 852. In step 852, MRF 804 receives the SIP re-Invite with SDP offer message 850. Operation proceeds from step 852 to step 854.

In step 854, MRF 804 generates and sends SIP re-INVITE message 856 to SBC 2 806. The SIP re-INVITE message 856 includes SDP offer message m=audio 2345 2345 G711, m=video 0 VP8. The SIP re-INVITE message includes the SBC 1 offer information and/or hint that was received by the MRF in the SIP re-INVITE message 850. The MRF 804 passes this SBC 1 offer information and/or hint without modifying it as it is included in a proprietary header or proprietary SDP attribute. Operation proceeds from step 854 to step 858.

In step 858, SBC 2 806 receives SIP re-INVITE message 856. SBC 2 handles the SIP re-INVITE message locally extracting its SBC 1 offer information from the proprietary header or SDP attribute or extracts the hint and uses the hint to obtain the SBC 1 offer information, e.g., from a database accessible to both SBC 1 and SBC 2. In some embodiments, the hint is an index or key that can be used to identify a record in which SBC 1 has included its offer information. The re-INVITE message 856 is not forwarded to Peer B (UE 2) but is terminated at SBC 2 806. Operation proceeds from step 858 to step 860.

In step 860, SBC 2 806 generates SIP 200 OK response message 862 in response to the SIP re-INVITE message with SDP answer message 856 and transmits or sends it to MRF 804. The SDP answer message 860 includes connection value C=0.0.0.0 for each of the media streams (audio and video), m=audio 5432 G711, m=video 0 VP8. Additionally, the SIP 200 OK with SDP message 858 includes SBC 2 SDP answer information in a proprietary SDP attribute or proprietary header or as a hint in the same or a similar manner to that described above in connection with the hint included in Re-invite message sent to MRF 804 and SBC 2 806. Operation proceeds from step 860 to step 864.

In step 864, MRF 804 receives SIP 200 OK with SDP answer message 862 transmitted from SBC 2 806 in response to SIP re-Invite message 856. Operation proceeds from step 864 to step 866.

In step 866, MRF 804 generates SIP 200 OK response message 868 and sends or transmits the message to SBC 1 802 in response to SIP re-INVITE message 850. SIP 200 OK response message 868 includes SDP answer message with connection value C=0.0.0.0 for each media stream (audio and video streams), m=audio 5432 G711, m=video 0 VP 8. The SDP answer message included in SIP 200 OK response 868 is in response to the SDP offer message included with SIP re-INVITE message 850. MRF 804 also includes in the SIP 200 OK response message 868, the SBC 2 SDP answer information included in the proprietary SDP attribute or header or the hint included in the proprietary SDP attribute or header of the SIP 200 OK response message 862 passing the SBC 2 answer information unmodified to SBC 1 802. Operation proceeds from step 866 to step 870.

In step 870, SBC 1 802 receives SIP 200 OK response message 868 and extracts the SBC 2 answer information or hint from the SIP 200 OK response message SDP proprietary attribute or header. If the SIP 200 OK response message includes the hint, SBC 1 802 uses the hint to obtain the SBC 1 answer message, e.g., by using the hint as an index to identify a record in a storage device, e.g., database, accessible to both SBC 1 802 and SBC 2 806. Operation proceeds from step 870 to step 872 where Real Time Transport Protocol media audio and video streams are established for the communications session which includes SBC 1 802 and SBC 2 806 but bypasses the MRF 804 as no transcoding is required.

MRF 804 releases the media resources it had reserved for the media streams (audio and video streams) of the communication session when it receives the Re-Invite message 850 with the connection value for all media streams set to C=0.0.0.0 and the SIP 200 OK message with SDP answer 862 with connection values set for all media streams to C=0.0.0.0. The connection value being set to C=0.0.0.0 indicates that no media is to be sent. As a result, the MRF 804 remains in the signaling path for the communications session but media streams (audio and video) bypass the MRF 804.

In some embodiments, the procedures for releasing intermediary nodes illustrated in connection with FIG. 6 are implemented to release the MRF 804 resources instead of the procedures shown in FIG. 8.

Depending on whether the SBC 1 802 or SBC 2 804 makes the decision as to whether transcoding is required or not, the SDP information for SBC 1 802 and SBC 2 804 are exchanged in the initial SIP INVITE and response steps 808-832 (for example when SBC 2 makes the decision) and/or during the SIP re-INVITE and response steps 847-870 (for example when the SBC 1 makes the decision).

The media release mechanism may, and in some embodiments is, used as a part of video transcoding scenarios. Media Servers like Acano would be looped as a part of SDP offer for audio and video transcoding. After the SDP answer is received, the call may become a pass-through call. The above mechanisms can be used in such a scenario to remove media server/transcoder out of the media path and still be in the signaling path.

Since the media server/transcoder is in the signaling path, if transcoding is needed in a later part of the call-flow, it can still be invoked.

Various embodiments provide the ability to bypass self and/or intermediary nodes from the media path without having the expectation that all intermediaries support OMR procedures. Various embodiments also provide the ability to inform intermediaries that local resources (at their end) can be released without needing to use any OMR specific attributes/semantics Various embodiments enable a SBC to support optimal media routing even when intermediaries don't support OMR procedures and also enables media transcoders to be taken out of media path when transcoding is not needed.

The SBC may be deployed as IBCF or IPX (Internetwork Packet Exchange) Proxy or in video transcoding scenarios.

In some embodiments, the connection value (c=) 0.0.0.0. is set at the session description in the SDP message while in some other embodiments, the connection value (c=) 0.0.0.0 is set in media description of the SDP message. When the IP address is the same for all media lines of the session the connection value is typically set at the session level. In such cases, there is a single IP address for all media lines with multiple ports for each media stream of the session. When not all of the media streams/lines uses the same IP address the connection value is set for each media stream in the media description portion of the SDP message.

As previously explained, various features of the invention allow for achieving Optimized Media Paths in an asynchronous network including Non-OMR nodes and also in video pass-through involving external transcoders/media server.

Figure 10:
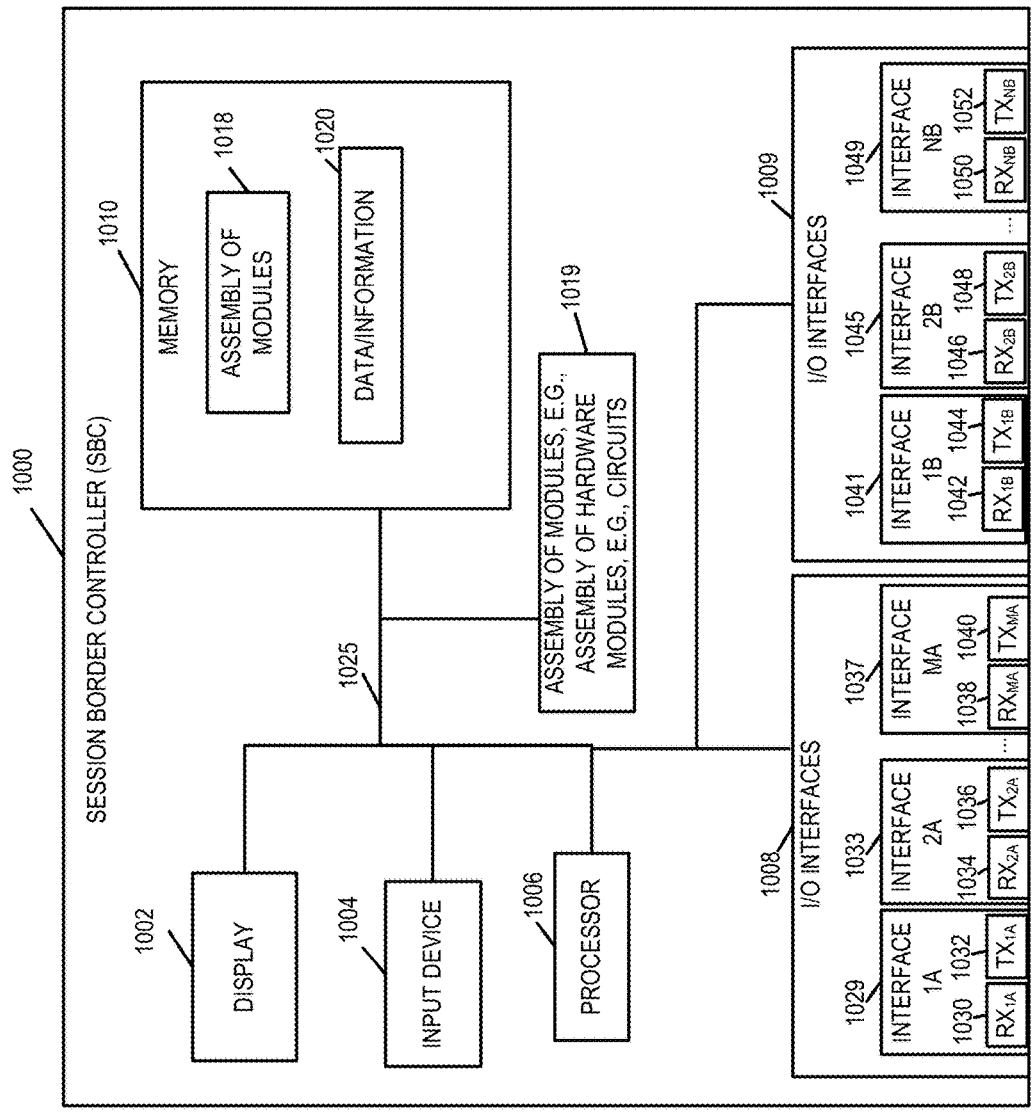
FIG. 10 illustrates an exemplary embodiment of a Session Border Controller in accordance with one embodiment of the present invention.

FIG. 10 illustrates an exemplary embodiment of a Session Border Controller in accordance with one embodiment of the present invention. Exemplary session border controller 1000 includes a display 1002, an input device 1004, a processor 1006, e.g., a CPU, I/O interfaces 1008 and 1009, which couple the SBC to a core network or various other devices including peer nodes, MRF nodes and user equipment, memory 1010, and an assembly of modules 1019, e.g., circuits corresponding to different modules, coupled together via a bus 1025 over which the various elements may interchange data and information. Memory 1010 includes an assembly of modules 1018, e.g., an assembly of software modules, and data/information 1020. I/O interfaces 1008 includes a plurality of interfaces (interface 1A 1029, interface 2A 1033, . . . , interface MA 1037). Each interface (interface 1A 1029, interface 2A 1033, . . . , interface MA 1037) includes a receiver and a transmitter (($RX_{1A}$ 1030, $TX_{1A}$ 1032), ($RX_{2A}$ 1034, $TX_{2A}$ 1036), . . . , ($RX_{MA}$ 1038, $TX_{MA}$ 1040)), respectively. I/O interfaces 1009 includes a plurality of interfaces (interface 1B 1041, interface 2B 1045, . . . , interface NB 1049). Each interface (interface 1B 1041, interface 2B 1045, . . . , interface NB 1049) includes a receiver and a transmitter (($RX_{1B}$ 1042, $TX_{1B}$ 1044), ($RX_{2B}$ 1046, $TX_{2B}$ 1048), . . . , ($RX_{NB}$ 1050, $TX_{NB}$ 1052)), respectively.

Figure 11:
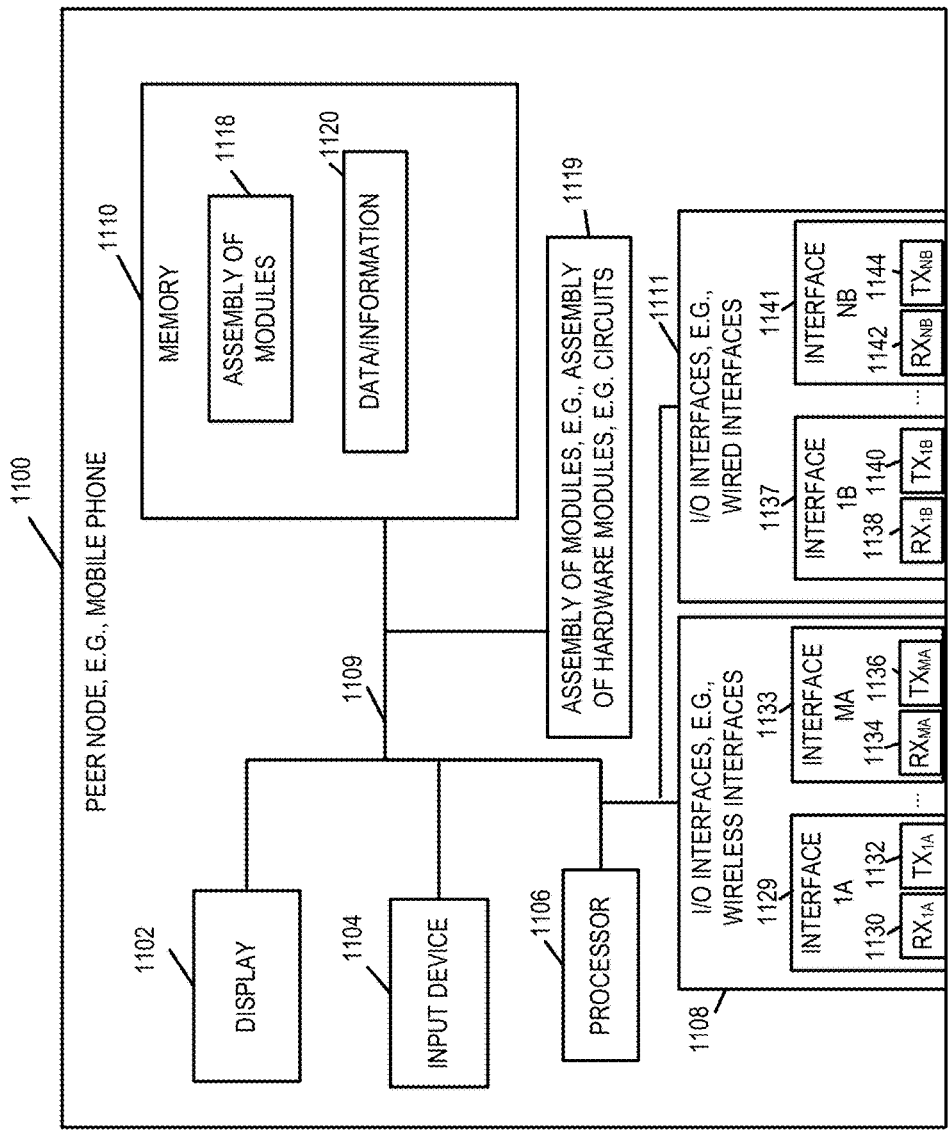
FIG. 11 illustrates an exemplary embodiment of a peer node in accordance with one embodiment of the present invention.

FIG. 11 illustrates an exemplary embodiment of a peer node in accordance with one embodiment of the present invention. Exemplary peer node 1100 includes a display 1102, an input device 1104 such as a keypad, a processor 1106, e.g., a CPU, I/O interfaces 1108 and 1111 which include receivers and transmitters, which couple the peer node to various devices such as SBCs and networks, memory 1110, and an assembly of modules 1119, e.g., circuits corresponding to different modules, coupled together via a bus 1109 over which the various elements may interchange data and information. Memory 1110 includes an assembly of modules 1118, e.g., an assembly of software modules, and data/information 1120. The assembly of modules 1119 and/or 1118 include modules for communicating over Internet Protocol networks using Session Initiation Protocol (SIP) and Session Description Protocol (SDP). The exemplary UE device 102, terminating side device 118 shown in FIG. 1, UEs (228, 230) shown in FIG. 2, UEs (334, 336) shown in FIG. 4, UEs (434, 436) shown in FIG. 4, UEs (542, 544) shown in FIG. 5, peer nodes or UEs described with respect to FIGS. 6, 7 and 8, are in some embodiments implemented in accordance with exemplary Peer node 1100 of FIG. 11. The exemplary peer node 1100 may, and in some embodiments is, implemented as a device such a Voice Over Internet Phone, a mobile phone, smartphone, tablet, laptop computer or other communications device. I/O interfaces 1108, e.g., wireless interfaces, includes a plurality of interfaces (interface 1A 1108, . . . , interface MA 1133). Each interface (interface 1A 1108, . . . , interface MA 1133) includes a receiver and a transmitter (($RX_{1A}$ 1130, $TX_{1A}$ 1132), . . . , ($RX_{MA}$ 1134, $TX_{MA}$ 1136 respectively. I/O interfaces 1111, e.g., wired interfaces, includes a plurality of interfaces (interface 1B 1137, . . . , interface NB 1141). Each interface (interface 1B 1137, . . . , interface NB 1141) includes a receiver and a transmitter (($RX_{1B}$ 1138, $TX_{1B}$ 1140), . . . , ($RX_{NB}$ 1142, $TX_{NB}$ 1144)), respectively.

Figure 12:
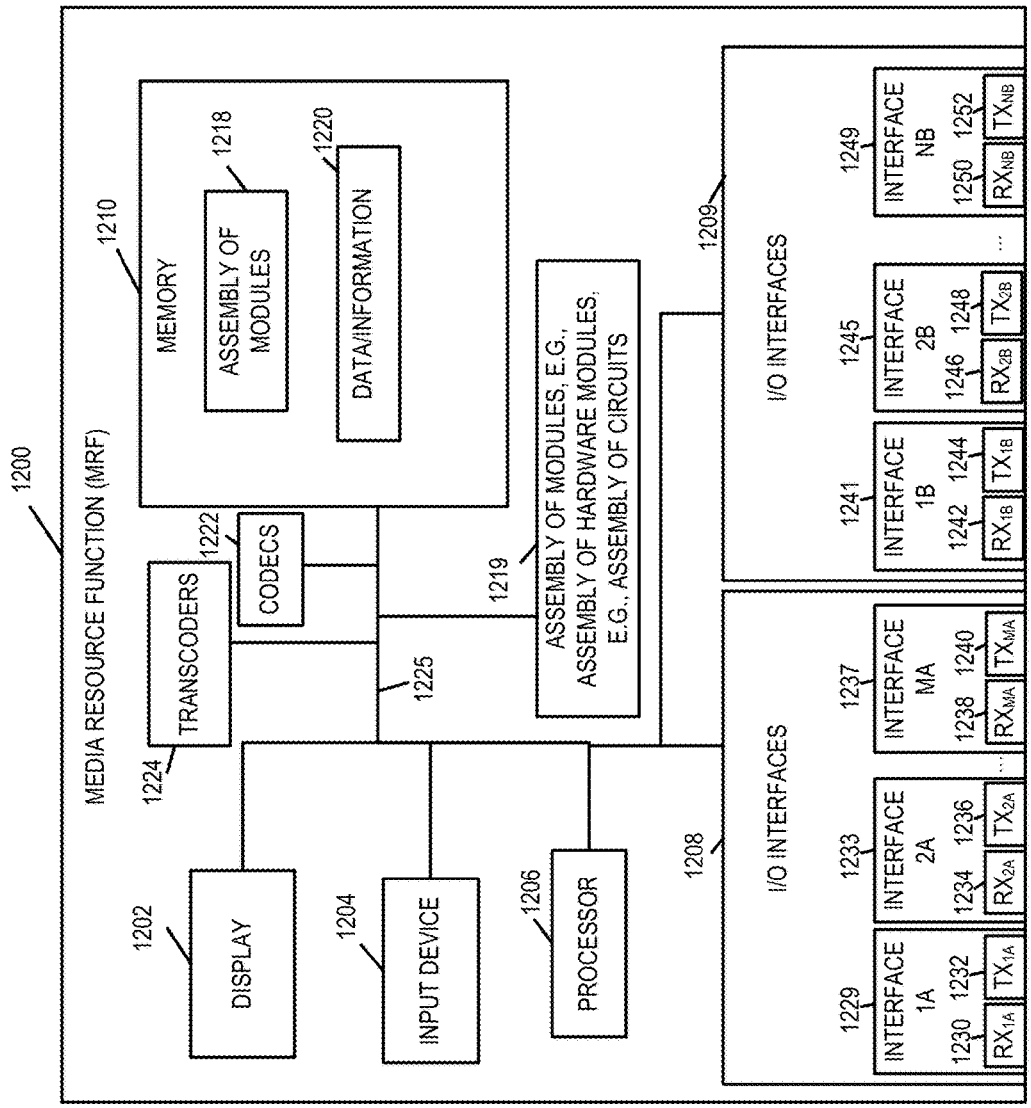
FIG. 12 illustrates an exemplary embodiment of a Media Function Resource node in accordance with one embodiment of the present invention.

FIG. 12 illustrates an exemplary embodiment of a Media Function Resource node 1200 in accordance with one embodiment of the present invention. Exemplary MRF 400 includes a display 402, an input device 404, a processor 406, e.g., a CPU, I/O interfaces 408 and 409, which couple the MRF to a core network or various other devices such as for example SBCs, codecs 422 such as audio and video codecs used for coding and decoding various media signals, transcoders 424 used for transcoding media signals, memory 410, and an assembly of modules 419, e.g., circuits corresponding to different modules, coupled together via a bus 425 over which the various elements may interchange data and information. Memory 410 includes an assembly of modules 418, e.g., an assembly of software modules, and data/information 420. I/O interfaces 1208 includes a plurality of interfaces (interface 1A 1229, interface 2A 1233, . . . , interface MA 1237). Each interface (interface 1A 1229, interface 2A 1233, . . . , interface MA 1237) includes a receiver and a transmitter (($RX_{1A}$ 1230, $TX_{1A}$ 1232), ($RX_{2A}$ 1234, $TX_{2A}$ 1236), . . . , ($RX_{MA}$ 1238, $TX_{MA}$ 1240)), respectively. I/O interfaces 1209 includes a plurality of interfaces (interface 1B 1241, interface 2B 1245, . . . , interface NB 1249). Each interface (interface 1B 1241, interface 2B 1245, . . . , interface NB 1249) includes a receiver and a transmitter (($RX_{1B}$ 1242, $TX_{1B}$ 1244), ($RX_{2B}$ 1246, $TX_{2B}$ 1248), . . . , ($RX_{NB}$ 1250, $TX_{NB}$ 1252)), respectively.

Figure 13:
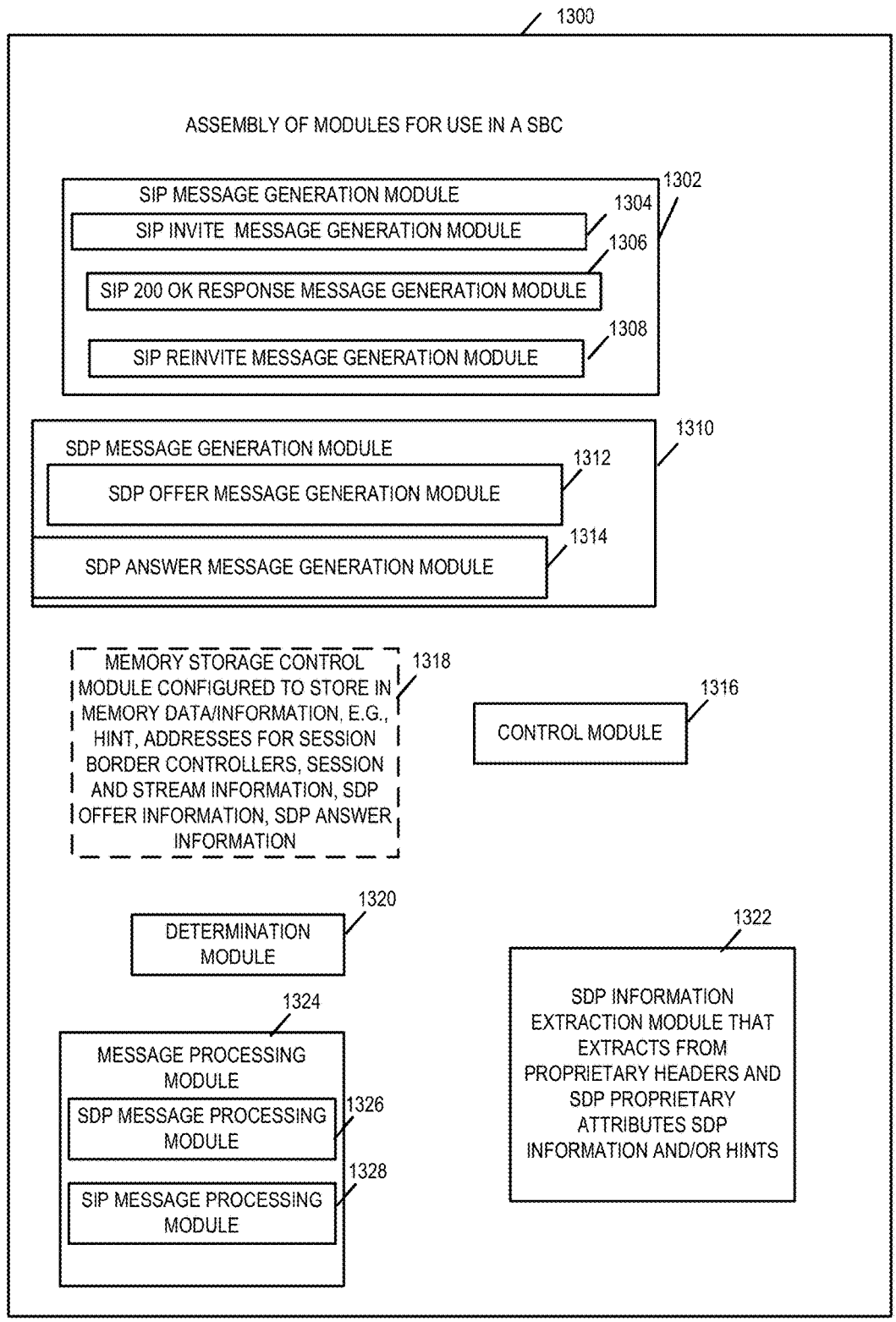
FIG. 13 illustrates an exemplary assembly of modules for a Session Border Controller in accordance with one embodiment of the present invention.

FIG. 13 which illustrates an assembly of modules for use in a SBC in accordance with an exemplary embodiment of the present invention. The assembly of modules may be, and in some embodiments is, used as the assembly of modules 1018 in SBC 1000 illustrated in FIG. 10 and in SBC-1 602, SBC-4 608, SBC-1 802 and SBC-2 806 in FIGS. 6, 7, and 8. In some embodiments, the assembly of modules 1300 is used as the assembly of assembly 1019 in SBC 1000 illustrated in FIG. 10. In some embodiments, some of the modules of the assembly of modules 1300 are implemented as hardware as part of the assembly of modules 1019 and some of the modules of the assembly of modules 1300 are implemented in software as part of the assembly of modules 1018. The assembly of modules 1300 includes a SIP message generation module 1302 including a SIP INVITE message generation module 1304, a SIP 200 OK response generation module 1306 and a SIP REINVITE generation module 1308, a SDP message generation module 1310 including a SDP offer message generation sub-module 1312 and a SDP answer generation sub-module 1314, a control module 1316 that controls the operation of the SBC, a determination module 1320 that determines when one or more media streams of a session should bypass one or more intermediary devices on the session signaling path, a SDP information extraction module 1322 that extracts from proprietary headers and proprietary SDP attributes SDP information (e.g., SDP offer and answer message information) and hint(s), a message processing module 1324 including a SDP message processing module 1326 and a SIP message processing module 1328, and an optional memory storage control module 1318 configured to store in memory data/information, e.g., SDP offer and answer information, hint information, e.g., SBCs, MRF nodes, and Peer device addresses. The SIP message generation module 1302 configured to generate SIP messages including SIP message with proprietary headers that include SDP offer and/or answer information or a hint that can be used to identify SDP offer and answer information; SIP messages with SDP messages including SDP messages with at least one proprietary attribute that includes SDP offer and/or answer information or a hint that can be used to identify SDP offer and answer information. The determination module 1320 in some embodiments is also configured to determine if a session initiation request corresponds to a loop back communications session based on the loop-back indication present in the session signaling, e.g., session initiation request. In some embodiments, the determination module is configured to check call leg information in the session initiation request to determine if the call leg information indicates that a first and second session border controller are in the same network realm as part of determining if the session corresponding to the session initiation request corresponds to a loop back session. In some embodiments, the determination module is configured to check a header field (e.g., a Feature-Caps header field) for a value (e.g., +g.3gpp.loopback) expressly indicating a loopback communication session, as part of determining if the session initiation request corresponds to a loop back session. In some embodiments, the determination module is also configured to determine if all of the intermediary devices on a portion of the signaling path between another SBC and the SBC including the determination module support 3GPP Optimal Media Routing Procedures. In some embodiments, the determination module 1320 is further configured to determine if one or more media streams corresponding to a session can bypass an external transcoders including in the session signaling path corresponding to a session initiation request. The SIP message generation module 1302 and its sub-modules SIP INVITE message generation module 1304, SIP 200 OK response message generation module 1306, SIP re-Invite message generation module 1308 are configured to generate the SIP messages discussed in connection with FIGS. 6, 7, and 8 and the various embodiments of the present invention. The SDP message generation module 1310 and sub-modules SDP offer message generation module 1312 and SDP answer message generation module 1314 are configured to generate the SDP offer and answer messages discussed in connection with FIGS. 6, 7 and 8 and the various embodiments of the present invention. The message processing module 1324 processes messages at the SBC for example messages received by the receivers of the I/O interfaces or to be transmitted by one or more of the transmitters of the I/O interfaces. The SIP message processing module 1328 is configured to process SIP messages and the SDP message processing module 1326 is configured to process SDP message and/or information. In some embodiments, the SDP information extraction module 1322 is a sub-module of message processing module 1324 or the SDP message processing sub-module 1326. The message processing module 1324 and its sub-modules are configured to process the SIP and SDP messages received and transmitted as discussed in connection with FIGS. 6, 7, and 8 and the various embodiments of the present invention.

In one embodiment of the communications method in accordance with the present invention, the method includes the steps of: receiving, at a first Session Border Controller (e.g, SBC 4), a session initiation request for a communications session between a first device (UE 1) and a second device (UE 2), said session initiation request being sent by a second session border controller (SBC 1) on behalf of the first device and traversing a portion of a signaling path extending between the first device (UE 1) and the first SBC (SBC 4) before being received at said first SBC, said portion of the signaling including one or more intermediary devices (node 2, node 3), said communications session including one or more media streams, determining, by the first session border controller (SBC 4), whether at least one of said one or more media streams should bypass one or more of the intermediary devices; and in response to determining that at least one of said one or more media streams should bypass one or more of the intermediary devices, operating the first session border controller (SBC 4) to generate a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address); ii) all SDP media stream connection values (e.g., c=value) being set to 0.0.0.0 and at least one media transport address being non-zero; indicating that at least one intermediary device (e.g., media resource function device) should be bypassed for the one or more media streams, and transmitting the SDP answer to the second session border controller (SBC 1) included on said signaling path. In some embodiments, the first SDP answer includes a proprietary SDP attribute that contains the SDP answer received from the second device. In some embodiments, a SIP header message sent in response to the initiation request from the first SBC to the second SBC includes a proprietary hint and/or the SDP answer received from the second device.

In various embodiments, a determination is made by a session border controller, e.g., SBC 4 of FIG. 6 or 7, as to whether all of the intermediary devices support 3GPP Optimal Media Routing procedures and if they do then using the 3GPP OMR to achieve optimal media routing of the media streams in a communication session which is being established. When it is determined that not all of the intermediary devices support 3GPP OMR procedures then the session border controller utilizes the procedures described and illustrated in connection with FIG. 6 or 7 to achieve optimal media routing of the media streams in the communications session being established. In various embodiments, when an external transcoder is used the procedures illustrated in FIG. 8 will be implemented so that one or more media streams of a communications session being established will bypass the external transcoder when it is determined that transcoding is not required. The procedures illustrated in the embodiment illustrated in FIG. 8 do not require session loopback.

List of Exemplary Numbered Method Embodiments

The references to the exemplary devices such as SBC 1, SBC 4, UE 1, UE 2 in connection with the below exemplary numbered method embodiments refer to the devices discussed in connection with FIGS. 6 and 7.

Method Embodiment 1

A communications method comprising: receiving, at a first Session Border Controller (e.g., SBC 4), a session initiation request for a communications session between a first device (e.g., UE 1) and a second device (e.g., UE 2), said session initiation request being sent by a second border controller (e.g., SBC 1) on behalf of the first device and traversing a portion of a signaling path extending between the first device (e.g., UE 1) and the first SBC (e.g., SBC 4) before being received at said first SBC, said portion of the signaling including one or more intermediary devices (e.g., node 2, node 3), said communications session including one or more media streams, determining, by the first session border controller (e.g., SBC 4), whether at least one of said one or more media streams should bypass one or more of the intermediary devices; and in response to determining that at least one of said one or more media streams should bypass one or more of the intermediary devices, operating the first session border controller (e.g., SBC 4) to generate a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address), ii) all SDP media stream connection values (e.g., c=value) being set to 0.0.0.0 and at least one media transport address being non-zero, or iii)

header information (e.g., SIP proprietary header) or SDP information (proprietary SDP attribute) indicating that at least one intermediary device (e.g., media resource function device) should be bypassed for the one or more media streams; and transmit the first SDP answer to the second session border controller (e.g., SBC 1) included on said signaling path.

Method Embodiment 2

The method of method embodiment 1, wherein the received session initiation request includes at least some SDP offer information received by the second SBC (e.g., SBC 1) from the first device (e.g., user device 1), said at least some SDP offer information including a media transport address (e.g., m=audio port) provided by the first device for a media stream of said communications session.

Method Embodiment 3

The method of method embodiment 2, wherein said at least some SDP offer information is included in a header field of the session initiation request which is automatically passed through intermediate nodes.

Method Embodiment 4

The method of method embodiment 1, further comprising: operating the first session border controller to determine if the session initiation request corresponds to a loop back communications session based on the loop-back indication present in the signaling.

Method Embodiment 5

The method of method embodiment 4, wherein operating the first session border controller to determine if the session initiation request corresponds to a loop back session includes: checking call leg information in the session initiation request to determine if the call leg information indicates that the first and second session border controllers are in the same network realm.

Method Embodiment 6

The method of method embodiment 4, wherein operating the first session border controller to determine if the session initiation request corresponds to a loop back session includes: checking a header field (e.g., a Feature-Caps header field) for a value (e.g., +g.3gpp.loopback) expressly indicating a loopback communication session. A loopback communication session being a communication session in which loopback routing is performed as specified in 3GPP TS 24.229 technical specification.

Method Embodiment 7

The method of method embodiment 2, wherein one or more intermediary nodes do not support 3GPP Optimal Media Routing procedures.

Method Embodiment 8

The method of method embodiment 1, further comprising: extracting the media transport address (e.g., m=audio port) provided by the first device for a media stream of said communications session from said at least some SDP offer information included in the received session initiation request; and send to the second device a second session initiation request generated, by the first session border controller, on behalf of the first device, said second session initiation request including a second SDP offer that includes the extracted media transport address (m=) provided by the first device.

Method Embodiment 9

The method of method embodiment 8, further comprising: receiving from the second device a second SDP answer including information provided by the second device in response to the second SDP offer, said information provided by the second device including a media transport address of the second device for use by a media stream of said communications session.

Method Embodiment 10

The method of method embodiment 9, wherein said first SDP answer includes all SDP media descriptor transport addresses being set to zero in standardized media descriptor fields of the first SDP answer; and wherein operating the first session border controller (SBC 4) to generate the first SDP answer in response to the first SDP offer includes: extracting at least some of the information from the second SDP answer, said extracted information including the media transport address of the second device for use by the media stream of said first communications session; and placing the media transport address of the second device in i) a proprietary header field which are different from standardized said media descriptor fields or ii) a propriety SDP attribute field of the first SDP answer which is from standardized said media descriptor fields.

Method Embodiment 11

The method of method embodiment 10, further comprising: operating the second session border controller (SBC 1) to receive the first SDP answer; operating the second session border controller (SBC 1) to extract from the propriety header or propriety SDP attribute field of the first SDP answer the media transport address of the second device; and operating the second session border controller (SBC1) to send a third SDP answer including the media transport address of the second device to the first device.

Method Embodiment 12

The method of method embodiment 11, further comprising: operating the first device to communicate media to the second device using the media transport address of the second device as part of the communications session, said media bypassing one or more of said intermediary devices.

Method Embodiment 13

The method of method embodiment 1 further comprising: establishing a media path for the communications session between the first device and second device which does not include the first session border controller or said intermediary devices.

Method Embodiment 14

The method of method embodiment 13 wherein said established media path between the first device and the second device does not include the second session border controller.

Method Embodiment 15

The method of method embodiment 14 wherein said first and second session border controllers and said first and second user equipment devices are operated in the same realm.

Method Embodiment 16

The method of method embodiment 15 wherein said first and second devices are both session initiation protocol devices.

Method Embodiment 17

The method of method embodiment 14 wherein the first device and the second device are peer devices to the first and second session border controllers.

Method Embodiment 18

The method of method embodiment 14 wherein the first device and the second device are user equipment devices.

Method Embodiment 19

The method of method embodiment 1, wherein said first SDP answer includes all SDP media stream connection values (e.g., c=value) being set to 0.0.0.0 and at least one media transport address being non-zero; and wherein the method further includes: operating the second session border controller, in response to receiving the first SDP answer, to send a re-invite message along said portion of the first path towards the first session border controller said reinvite message including a third SDP offer message including information relating to media attributes of the media streams of the communication session obtained from the first SDP answer including all SDP media stream connection values (e.g., c=value) that were set to 0.0.0.0 and at least one media transport address being non-zero.

Method Embodiment 20

The communications method of method embodiment 1 wherein the first and second session border controllers are operated by the same operator.

Method Embodiment 21

The communications method of method embodiment 1 wherein the first and second session border controllers are situated between a first and second network, said first network being operated by a first operator and said second network being operated by a second operator, said first and second network operators being different.

Method Embodiment 22

The communications method of method embodiment 1 wherein said first and second session border controllers act as an InterConnect Border Control Function devices.

Method Embodiment 23

The communications method of method embodiment 1 wherein said first and second session initiation requests are SIP INVITE request messages.

Method Embodiment 24

A communications method comprising: receiving, at a first Session Border Controller (e.g., SBC 4), a session initiation request for a communications session between a first device (e.g., UE 1) and a second device (e.g., UE 2), said session initiation request being sent by a second session border controller (e.g., SBC 1) on behalf of the first device and traversing a portion of a signaling path extending between the first device (e.g., UE 1) and the first SBC (e.g., SBC 4) before being received at said first SBC, said portion of the signaling including one or more intermediary devices (e.g., node 2, node 3), said communications session including one or more media streams; determining, by the first session border controller (e.g., SBC 4), whether at least one of said one or more media streams should bypass one or more of the intermediary devices; and in response to determining that at least one of said one or more media streams should bypass one or more of the intermediary devices, operating the first session border controller (e.g., SBC 4) to generate a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address) or ii) all SDP media stream connection values (e.g., c=value) being set to 0.0.0.0 and at least one media transport address being non-zero.

or iii) header information (e.g., SIP proprietary header) or SDP information (proprietary SDP attribute) indicating that at least one intermediary device (e.g., media resource function device) should be bypassed for the one or more media streams; and transmit the first SDP answer to the second session border controller (e.g., SBC 1) included on said signaling path.

Method Embodiment 25

The method of method embodiment 24 wherein said first SDP answer is included in a SIP response message including header information (e.g., SIP proprietary header) or SDP information (proprietary SDP attribute) indicating that at least one intermediary device (e.g., media resource function device) should be bypassed for the one or more media streams.

Method Embodiment 26

The method of method embodiment 25 wherein said header information or SDP information included in said SIP response message includes SDP answer information received by the first SBC (e.g., SBC 4 from the second device (e.g., UE 2).

Method Embodiment 27

The method of method embodiment 24 further comprising: determining, by the first session border controller (e.g., SBC 4), that one or more of the intermediary devices do not support 3GPP OMR procedures.

Method Embodiment 28

The method of method embodiment 24 further comprising: determining that one or more media streams of the session do not require transcoding; determining that one or more of the intermediary devices is an Media Resource Function device that said one or more media streams should bypass.

Method Embodiment 29

The method of method embodiment 1, wherein said first SDP answer includes all SDP media descriptor transport addresses being set to zero in standardized media descriptor fields of the first SDP answer; and wherein operating the first session border controller (SBC 4) to generate the first SDP answer in response to the first SDP offer includes: extracting at least some of the information from the second SDP answer, said extracted information including the media transport address of the second device for use by the media stream of said first communications session; and placing the media transport address of the second device in i) a proprietary header field which are different from standardized said media descriptor fields or ii) a propriety SDP attribute field of the first SDP answer which is from standardized said media descriptor fields.

List of Exemplary Numbered Apparatus/System Embodiments

The references to the exemplary devices such as SBC 1, SBC 4, UE 1, UE 2 in connection with the below exemplary numbered apparatus/system embodiments refer to the devices discussed in connection with FIGS. 6 and 7.

System Embodiment 1

A communications system comprising: a first Session Border Controller (SBC) comprising: a first processor controlling the first SBC to: receive, at the first Session Border Controller (e.g., SBC 4), a session initiation request for a communications session between a first device (e.g., UE 1) and a second device (e.g., UE 2), said session initiation request being sent by a second session border controller (e.g., SBC 1) on behalf of the first device and traversing a portion of a signaling path extending between the first device (e.g., UE 1) and the first SBC (e.g., SBC 4) before being received at said first SBC, said portion of the signaling including one or more intermediary devices (e.g., node 2, node 3), said communications session including one or more media streams, determine, by the first session border controller (e.g., SBC 4), whether at least one of said one or more media streams should bypass one or more of the intermediary devices; and generate, in response to determining that at least one of said one or more media streams should bypass one or more of the intermediary devices, a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address); ii) all SDP media stream connection values (e.g., c=value) being set to 0.0.0.0 and at least one media transport address being non-zero; or iii) header information (e.g., proprietary header) or SDP information (proprietary SDP attribute) indicating that at least one intermediary device (e.g., media resource function device) should be bypassed for the one or more media streams; and transmit the first SDP answer to the second session border controller (SBC 1) included on said signaling path.

System Embodiment 2

The communications system of system embodiment 1, wherein the received session initiation request includes at least some SDP offer information received by the second SBC (e.g., SBC 1) from the first device (e.g., UE 1), said at least some SDP offer information including a media transport address (e.g., m=audio port) provided by the first device for a media stream of said communications session.

System Embodiment 3

The communications system of system embodiment 2, wherein said at least some SDP offer information is included in a header field of the session initiation request which is automatically passed through intermediate nodes.

System Embodiment 4

The communications system of system embodiment 1, wherein said first processor further controls the first SBC to: determine if the session initiation request corresponds to a loop back communications session based on the loop-back indication present in the signaling.

System Embodiment 5

The communications system of system embodiment 4, said first processor controls the first SBC to: check call leg information in the session initiation request to determine if the call leg information indicates that the first and second session border controllers are in the same network realm, as part of controlling the first SBC to determine if the session initiation request corresponds to a loop back session.

System Embodiment 6

The communications system of system embodiment 4, wherein said first processor controls the first SBC to: check a header field (e.g., a Feature-Caps header field) for a value (e.g., +g.3gpp.loopback) expressly indicating a loopback communication session, as part of controlling the first session border controller to determine if the session initiation request corresponds to a loop back session.

System Embodiment 7

The communications system of system embodiment 2, wherein one or more intermediary nodes do not support 3GPP Optimal Media Routing procedures.

System Embodiment 8

The communications system of system embodiment 1, wherein said first processor further controls the first SBC to:

extract the media transport address (e.g., m=audio port) provided by the first device for a media stream of said communications session from said at least some SDP offer information included in the received session initiation request; and send to the second device a second session initiation request generated, by the first session border controller, on behalf of the first device, said second session initiation request including a second SDP offer that includes the extracted media transport address (m=)provided by the first device.

System Embodiment 9

The communications system of system embodiment 8, wherein said first processor further controls the first SBC to: receive from the second device a second SDP answer including information provided by the second device in response to the second SDP offer, said information provided by the second device including a media transport address of the second device for use by a media stream of said communications session.

System Embodiment 10

The communications system of system embodiment 9, wherein said first SDP answer includes all SDP media descriptor transport addresses being set to zero in standardized media descriptor fields of the first SDP answer; and wherein the first processor further controls the first session border controller (SBC 4) to: extract at least some of the information from the second SDP answer, said extracted information including the media transport address of the second device for use by the media stream of said first communications session; and place the media transport address of the second device in i) a proprietary header field which are different from standardized said media descriptor fields or ii) a propriety SDP attribute field of the first SDP answer which is different from standardized said media descriptor fields, as part of controlling the first SBC to generate an SDP answer in response to the first SDP offer.

System Embodiment 11

The communications system of system embodiment 10, further comprising: a second session border controller (e.g., SBC 1) comprising: a second processor controlling the second session border controller (e.g., SBC 1) to: receive the first SDP answer; extract from the propriety header or propriety SDP attribute field of the first SDP answer the media transport address of the second device; and send a third SDP answer including the media transport address of the second device to the first device.

System Embodiment 12

The communications system of system embodiment 11, further comprising: said first device comprising a third processor controlling the first device to: communicate media to the second device using the media transport address of the second device as part of the communications session, said media bypassing one or more of said intermediary devices.

System Embodiment 13

The communications system of embodiment 1, wherein said first SDP answer is used in establishing a media path for the communications session between the first device and second device which does not include the first session border controller or said intermediary devices.

System Embodiment 14

The communications system of system embodiment 13 wherein said established media path between the first device and the second device does not include the second session border controller.

System Embodiment 15

The communications system of system embodiment 14 wherein said first and second session border controllers and said first and second user equipment devices are operated in the same realm.

System Embodiment 16

The communications system of system embodiment 15 wherein said first and second devices are both session initiation protocol devices.

System Embodiment 17

The communications system of system embodiment 14 wherein the first device and the second device are peer devices to the first and second session border controllers.

System Embodiment 18

The communications system of system embodiment 14 wherein the first device and the second device are user equipment devices.

System Embodiment 19

The communications system of system embodiment 1, wherein said first SDP answer includes all SDP media stream connection values (e.g., c=value) being set to 0.0.0.0 and at least one media transport address being non-zero; and wherein the second processor is further controls the second session border controller to: send, in response to receiving the first SDP answer, a re-invite message along said portion of the first path towards the first session border controller said reinvite message including a third SDP offer message including information relating to media attributes of the media streams of the communication session obtained from the first SDP answer including all SDP media stream connection values (e.g., c=value) that were set to 0.0.0.0 and at least one media transport address being non-zero.

System Embodiment 20

The communications system of system embodiment 1 wherein the first and second session border controllers are operated by the same operator.

System Embodiment 21

The communications system of system embodiment 1 wherein the first and second session border controllers are situated between a first and second network, said first network being operated by a first operator and said second network being operated by a second operator, said first and second network operators being different.

System Embodiment 22

The communications system of system embodiment 1 wherein said first and second session border controllers act as an InterConnect Border Control Function devices.

System Embodiment 23

The communications system of system embodiment 1 wherein said first and second session initiation requests are SIP INVITE request messages.

System Embodiment 24

A communications system comprising: a first Session Border Controller (SBC) comprising: a first processor controlling the first SBC to: receive, at the first Session Border Controller (e.g., SBC 4), a session initiation request for a communications session between a first device (e.g., UE 1) and a second device (e.g., UE 2), said session initiation request being sent by a second session border controller (e.g., SBC 1) on behalf of the first device and traversing a portion of a signaling path extending between the first device (e.g., UE 1) and the first SBC (e.g., SBC 4) before being received at said first SBC, said portion of the signaling including one or more intermediary devices (e.g., node 2, node 3), said communications session including one or more media streams, determine, by the first session border controller (e.g., SBC 4), whether at least one of said one or more media streams should bypass one or more of the intermediary devices; and generate, in response to determining that at least one of said one or more media streams should bypass one or more of the intermediary devices, a first SDP answer in response to a first SDP offer included in said received session initiation request, said first SDP answer including at least one of: i) all SDP media descriptor transport addresses being set to zero in the media descriptor fields of the first SDP answer (e.g., m=transport value where an m line includes a media name, e.g., audio, followed by a transport address); ii) all SDP media stream connection values (e.g., c=value) being set to 0.0.0.0 and at least one media transport address being non-zero; and transmit the first SDP answer to the second session border controller (SBC 1) included on said signaling path.

System Embodiment 25

The communications system of system embodiment 24 wherein said first SDP answer is included in a SIP response message including header information (e.g., SIP proprietary header) or SDP information (proprietary SDP attribute) indicating that at least one intermediary device (e.g., media resource function device) should be bypassed for the one or more media streams.

System Embodiment 26

The communications system of system embodiment 25 wherein said header information or SDP information included in said SIP response message includes SDP answer information received by the first SBC (e.g., SBC 4 from the second device (e.g., UE 2).

System Embodiment 27

The system of system embodiment 24 wherein said first session border controller (e.g., SBC 4), is controlled to determine that one or more of the intermediary devices do not support 3GPP OMR procedures.

System Embodiment 28

The system of system embodiment 24 wherein said first session border controller is controlled to determine that one or more media streams of the session do not require transcoding and that one or more of the intermediary devices is an Media Resource Function device that said one or more media streams should bypass.

System Embodiment 29

The communications system of system embodiment 1, wherein said first SDP answer includes all SDP media descriptor transport addresses being set to zero in standardized media descriptor fields of the first SDP answer; and wherein the first processor further controls the first session border controller (SBC 4) to: extract at least some of the information from the second SDP answer, said extracted information including the media transport address of the second device for use by the media stream of said first communications session; and place the media transport address of the second device in i) a proprietary header field which are different from standardized said media descriptor fields or ii) a propriety SDP attribute field of the first SDP answer which is different from standardized said media descriptor fields, as part of controlling the first SBC to generate an SDP answer in response to the first SDP offer.

The techniques of various embodiments may be implemented using software, hardware and/or a combination of software and hardware. Various embodiments are directed to apparatus, e.g., session border controllers, media resource function devices, telecommunications systems, network nodes and/or network equipment devices. Various embodiments are also directed to methods, e.g., method of controlling and/or operating, session border controllers, user devices, real-time communications entities, telecommunications systems, network nodes and/or MRF devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry. In some embodiments, one or more processors included in a device, such as a session border controller, control the operation of the session border controller to perform the step. The I/O interfaces, transmitters and receivers are hardware devices.

In various embodiments nodes and/or elements described herein are implemented using one or more modules to perform the steps corresponding to one or more methods, for example, message reception, signal processing, sending, comparing, determining and/or transmission steps. Thus, in some embodiments various features are implemented using modules or in some embodiments logic such as for example logic circuits. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and any claims which follow. Such variations are to be considered within the scope of the invention.

What is claimed is:

1. A communications method comprising:
   receiving, at a first session border controller, a first session initiation request for a communications session between a first device and a second device, said first session initiation request being sent by a second session border controller on behalf of the first device and traversing a portion of a signaling path extending between the first device and the first session border controller before being received at said first session border controller, said portion of the signaling path including one or more intermediary devices, said communications session including one or more media streams;
   determining, by the first session border controller, whether at least one of said one or more media streams should bypass one or more of the intermediary devices; and
   in response to determining that at least one of said one or more media streams should bypass one or more of the intermediary devices, operating the first session border controller to generate a first Session Description Protocol (SDP) answer in response to a first SDP offer included in said received first session initiation request, said first SDP answer including at least one of: i) all SDP media descriptor transport addresses being set to zero in the media descriptor fields of the first SDP answer, ii) all SDP media stream connection values being set to 0.0.0.0 and at least one media descriptor transport address being non-zero, or iii) header information or SDP information indicating that at least one intermediary device should be bypassed for the one or more media streams; and
   wherein operating the first session border controller to generate the first SDP answer in response to the first SDP offer includes:
      extracting one or more pieces of information from a second SDP answer received from said second device in response to a second SDP offer sent from said first session border controller to said second device on behalf of said first device, said one or more pieces of extracted information including a media descriptor transport address of the second device for use by one of the one or more media streams of said communications session; and
      placing the media descriptor transport address of the second device in i) a proprietary header field which is different from standardized media descriptor fields included in said first SDP answer or ii) a proprietary SDP attribute field of the first SDP answer which is different from standardized media descriptor fields in said first SDP answer.

2. The method of claim 1, wherein the received first session initiation request includes one or more pieces of SDP offer information received by the second session border controller from the first device, said one or more pieces of SDP offer information including a media descriptor transport address provided by the first device for a media stream of said communications session.

3. The method of claim 2, wherein said one or more pieces of SDP offer information is included in a header field of the first session initiation request which is automatically passed through said one or more intermediary devices.

4. The method of claim 1, further comprising:
operating the first session border controller to determine if the first session initiation request corresponds to a loop-back communications session based on whether a loop-back indication is present in signaling for establishing the communications session.

5. The method of claim 4, wherein operating the first session border controller to determine if the first session initiation request corresponds to a loop-back communications session includes:
checking call leg information in the first session initiation request to determine if the call leg information indicates that the first and second session border controllers are in the same network realm.

6. The method of claim 4, wherein operating the first session border controller to determine if the first session initiation request corresponds to a loop-back communications session includes:
checking a header field for a value expressly indicating a loopback communications session.

7. The communications method of claim 2, wherein one or more of said intermediary devices do not support 3GPP Optimal Media Routing procedures.

8. The method of claim 2, further comprising:
extracting the media descriptor transport address provided by the first device for a media stream of said communications session from said one or more pieces of SDP offer information included in the received first session initiation request; and
sending to the second device, a second session initiation request generated, by the first session border controller, on behalf of the first device, said second session initiation request including said second SDP offer that includes the extracted media descriptor transport address provided by the first device.

9. The method of claim 8, further comprising:
operating the first device to communicate media to the second device using the media descriptor transport address of the second device as part of the communications session, said media bypassing one or more of said intermediary devices.

10. A communications method comprising:
receiving, at a first session border controller, a first session initiation request for a communications session between a first device and a second device, said first session initiation request being sent by a second session border controller on behalf of the first device and traversing a portion of a signaling path extending between the first device and the first session border controller before being received at said first session border controller, said portion of the signaling path including one or more intermediary devices, said communications session including one or more media streams;
determining, by the first session border controller, whether at least one of said one or more media streams should bypass one or more of the intermediary devices; and in response to determining that at least one of said one or more media streams should bypass one or more of the intermediary devices, operating the first session border controller to generate a first Session Description Protocol (SDP) answer in response to a first SDP offer included in said received first session initiation request;
extracting a media descriptor transport address provided by the first device for a media stream of said communications session from one or more pieces of SDP offer information included in the first SDP offer included in the received first session initiation request; and
sending to the second device prior to the completion of the generation of the first SDP answer, a second session initiation request generated, by the first session border controller, on behalf of the first device, said second session initiation request including a second SDP offer that includes the extracted media descriptor transport address provided by the first device;
receiving from the second device a second SDP answer including information provided by the second device in response to the second SDP offer, said information provided by the second device including a media descriptor transport address of the second device for use by a media stream of said communications session;
wherein said first SDP answer includes all SDP media descriptor transport addresses being set to zero in standardized media descriptor fields of the first SDP answer; and
wherein operating the first session border controller to generate the first SDP answer in response to the first SDP offer includes:
extracting one or more pieces of information from the second SDP answer, said one or more pieces of extracted information including the media descriptor transport address of the second device for use by the media stream of said communications session; and
placing the media descriptor transport address of the second device in i) a proprietary header field which is different from said standardized media descriptor fields or ii) a proprietary SDP attribute field of the first SDP answer which is different from said standardized media descriptor fields.

11. The method of claim 10, further comprising:
operating the second session border controller to receive the first SDP answer from the first session border controller;
operating the second session border controller to extract the media descriptor transport address of the second device from the proprietary header field or the propriety SDP attribute field of the first SDP answer; and
operating the second session border controller to send to the first device a third SDP answer including the media descriptor transport address of the second device.

12. The method of claim 11, further comprising:
operating the first device to communicate media to the second device using the media descriptor transport address of the second device as part of the communications session, said media bypassing one or more of said intermediary devices.

13. The method of claim 1,
wherein said first SDP answer includes all SDP media stream connection values being set to 0.0.0.0 and at least one media descriptor transport address being non-zero; and
wherein the method further includes:
operating the second session border controller, in response to receiving the first SDP answer, to send a re-invite message along said portion of the signaling path towards the first session border controller, said reinvite message including a third SDP offer message including information relating to media attributes of the media streams of the communication session obtained from the first SDP answer including all SDP media stream connection values that were set to 0.0.0.0 and at least one media descriptor transport address being non-zero.

14. A communications system comprising:
a first session border controller comprising:
   a first processor controlling the first session border controller to:
      receive, at the first session border controller, a first session initiation request for a communications session between a first device and a second device, said first session initiation request being sent by a second session border controller on behalf of the first device and traversing a portion of a signaling path extending between the first device and the first session border controller before being received at said first session border controller, said portion of the signaling path including one or more intermediary devices, said communications session including one or more media streams;
      determine, by the first session border controller, whether at least one of said one or more media streams should bypass one or more of the intermediary devices; and
      generate, in response to determining that at least one of said one or more media streams should bypass one or more of the intermediary devices, a first Session Description Protocol (SDP) answer in response to a first SDP offer included in said received first session initiation request, said first SDP answer including at least one of: i) all SDP media descriptor transport addresses being set to zero in the media descriptor fields of the first SDP answer; ii) all SDP media stream connection values being set to 0.0.0.0 and at least one media descriptor transport address being non-zero; or iii) header information or SDP information indicating that at least one intermediary device should be bypassed for the one or more media streams, said generating the first SDP answer in response to the first SDP offer including:
         extracting one or more pieces of information from a second SDP answer received from said second device in response to a second SDP offer sent from said first session border controller to said second device on behalf of said first device, said one or more pieces of extracted information including a media descriptor transport address of the second device for use by one of the one or more media streams of said communications session; and
         placing the media descriptor transport address of the second device in i) a proprietary header field which is different from standardized media descriptor fields included in said first SDP answer or ii) a proprietary SDP attribute field of the first SDP answer which is different from standardized media descriptor fields in said first SDP answer; and
      transmit the first SDP answer to the second session border controller included on said signaling path.

15. The communications system of claim 14, wherein the received first session initiation request includes one or more pieces of SDP offer information received by the second session border controller from the first device, said one or more pieces of SDP offer information including a media descriptor transport address provided by the first device for a media stream of said communications session.

16. The communications system of claim 15, wherein said one or more pieces of SDP offer information is included in a header field of the first session initiation request which is automatically passed through said one or more intermediary devices.

17. The communications system of claim 14, wherein said first processor further controls the first session border controller to:
   determine if the first session initiation request corresponds to a loop-back communications session based on whether a loop-back indication is present in signaling for establishing the communications session.

18. The communications system of claim 17, wherein said first processor further controls the first session border controller to: check call leg information in the first session initiation request to determine if the call leg information indicates that the first and second session border controllers are in the same network realm, as part of controlling the first session border controller to determine if the session initiation request corresponds to a loop-back communications session.

19. The communications system of claim 15, wherein one or more of said intermediary devices do not support 3GPP Optimal Media Routing procedures.

20. The communications system of claim 14, wherein said first processor further controls the first session border controller to:
   extract the media descriptor transport address provided by the first device for a media stream of said communications session from said one or more pieces of SDP offer information included in the received first session initiation request; and
   send to the second device a second session initiation request generated, by the first session border controller, on behalf of the first device, said second session initiation request including the second SDP offer that includes the extracted media descriptor transport address provided by the first device.

* * * * *